US007227602B2

(12) United States Patent
Jeon et al.

(10) Patent No.: US 7,227,602 B2
(45) Date of Patent: Jun. 5, 2007

(54) IN-PLANE SWITCHING LIQUID CRYSTAL DISPLAY COMPRISING COMPENSATION FILM FOR ANGULAR FIELD OF VIEW USING +A-PLATE AND +C-PLATE

(75) Inventors: Byoung Kun Jeon, Daejeon (KR); Serey Belyaev, Daejeon (KR); Jeong Su Yu, Daejeon (KR); Nikolay Malimonenko, Daejeon (KR)

(73) Assignee: LG Chem, Ltd., Seoul (KR)

( * ) Notice: Subject to any disclaimer, the term of this patent is extended or adjusted under 35 U.S.C. 154(b) by 285 days.

(21) Appl. No.: 10/969,206

(22) Filed: Oct. 21, 2004

(65) Prior Publication Data

US 2005/0140900 A1    Jun. 30, 2005

(30) Foreign Application Priority Data

Oct. 22, 2003    (KR) ...................... 10-2003-0073792

(51) Int. Cl.
*G02F 1/1335* (2006.01)
(52) U.S. Cl. ...................................................... 349/119
(58) Field of Classification Search ................ 349/117, 349/118, 119, 120, 121
See application file for complete search history.

(56) References Cited

U.S. PATENT DOCUMENTS

| 3,807,831 A | 4/1974 | Soref |
| 6,115,095 A | 9/2000 | Suzuki et al. |
| 6,285,430 B1 | 9/2001 | Saito |
| 6,995,816 B2* | 2/2006 | Mi et al. ...................... 349/96 |
| 2006/0203158 A1* | 9/2006 | Parri et al. .................. 349/117 |

FOREIGN PATENT DOCUMENTS

| EP | 1 353 214 A2 | 10/2003 |
| JP | 2003-195310 | 7/2003 |
| KR | 101999004389 A | 1/1999 |
| KR | 1019990059998 A | 7/1999 |
| WO | WO 01/20393 A1 | 3/2001 |

* cited by examiner

*Primary Examiner*—Toan Ton
(74) *Attorney, Agent, or Firm*—McKenna Long & Aldridge LLP

(57) ABSTRACT

Disclosed is an in-plane switching liquid crystal display. The in-plane switching liquid crystal display improves the contrast characteristic at a front and at a predetermined inclination angle thereof by using a +A-plate and a +C-plate while minimizing a color shift according to viewing angles in the black state.

33 Claims, 22 Drawing Sheets

IN-PLANE SWITCHING LIQUID CRYSTAL DISPLAY COMPRISING COMPENSATION FILM FOR ANGULAR FIELD OF VIEW USING +A-PLATE AND +C-PLATE

TECHNICAL FIELD

The present invention relates to a liquid crystal display (LCD), and more particularly to an in-plane switching liquid crystal display (IPS-LCD) including a compensation film using a +A-plate(s) and a +C-plate(s) in order to improve a viewing angle characteristic of the in-plane switching liquid crystal display filled with liquid crystal of positive dielectric anisotropy ($\Delta \in > 0$).

BACKGROUND ART

An IPS-LCD is disclosed in U.S. Pat. No. 3,807,831. However, the IPS-LCD disclosed in U.S. Pat. No. 3,807,831 does not use a compensation film. Accordingly, the above IPS-LCD represents a low contrast ratio at a predetermined inclination angle due to a relatively great amount of light leakage in the black state of the IPS-LCD.

U.S. Pat. No. 5,189,538 discloses an LCD including a viewing angle compensation film using an A-plate and a positive biaxial retardation film.

In addition, U.S. Pat. No. 6,115,095 discloses an IPS-LCD including a compensation film using a +C-plate and an A-plate. Characteristics of the IPS-LCD disclosed in U.S. Pat. No. 6,115,095 are as follows:

1) A liquid crystal layer is horizontally aligned between two substrates in such a manner that an electric field is supplied in parallel to the liquid crystal layer by means of electrodes.

2) At least one A-plate and C-plate is sandwiched between two polarizer plate.

3) A main optical axis of an A-plate is perpendicular to a main optical axis of a liquid crystal layer.

4) A retardation value of a liquid crystal layer $R_{LC}$, a retardation value of a +C-plate $R_{+C}$, and a retardation value of an A-plate $R_{+A}$ are determined such that they satisfy the following equation.

$$R_{LC}:R_{+C}:R_{+A} \approx 1:0.5:0.25$$

5) A relationship between retardation values of the A-plate and C-plate and a thickness retardation value of a polarizer plate protective film (TAC, COP and PNB) is not disclosed.

A main object of using the A-plate and C-plate in U.S. Pat. No. 6,115,095 is to compensate for a color shift of the IPS-LCD in a white state (a bright state). In this case, although the color shift of the IPS-LCD in the white state can be reduced, a great amount of light leakage may occur at a predetermined inclination angle of the IPS-LCD in a black state. For this reason, the IPS-LCD represents a relatively low contrast ratio at the predetermined inclination angle.

Recently, various methods of reducing the color shift in the white state has been proposed and used. For example, a two-domain liquid crystal alignment using a zig-zag type electrode structure has been suggested in order to minimize the color shift in the white state.

BRIEF DESCRIPTION OF THE DRAWINGS

FIGS. 4 to 9 are views illustrating structures of IPS-LCDs including a viewing angle compensation film according to one embodiment of the present invention, in which FIG. 4 is a first IPS-LCD structure, FIG. 5 is a second IPS-LCD structure, FIG. 6 is a third IPS-LCD structure, FIG. 7 is a fourth IPS-LCD structure, FIG. 8 is a fifth IPS-LCD structure, and FIG. 9 is a sixth IPS-LCD structure.

FIGS. 10 to 14 are graphs representing simulation results for a contrast characteristic at inclination angles of 0° to 80° in all azimuthal angles when a white light is used in a structure of an IPS-LCD including a viewing angle compensation film according to one embodiment of the present invention, in which FIG. 10 is a simulation result of a first IPS-LCD structure, FIG. 11 is a simulation result of a second IPS-LCD structure, FIG. 12 is a simulation result of a third IPS-LCD structure, FIG. 13 is a simulation result of a fourth IPS-LCD structure, and FIG. 14 is a simulation result of a fifth IPS-LCD structure.

FIGS. 15 to 26 are views illustrating structures of IPS-LCDs including a viewing angle compensation film according to one embodiment of the present invention, in which FIG. 15 is a seventh IPS-LCD structure, FIG. 16 is an eighth IPS-LCD structure, FIG. 17 is a ninth IPS-LCD structure, FIG. 18 is a tenth IPS-LCD structure, FIG. 19 is an eleventh IPS-LCD structure, FIG. 20 is a twelfth IPS-LCD structure, FIG. 21 is a thirteenth IPS-LCD structure, FIG. 22 is a fourteenth IPS-LCD structure, FIG. 23 is a fifteenth IPS-LCD structure, FIG. 24 is a sixteenth IPS-LCD structure, FIG. 25 is a seventeenth IPS-LCD structure, and FIG. 26 is an eighteenth IPS-LCD structure.

FIGS. 27 to 32 are graphs representing simulation results for a contrast characteristic at inclination angles of 0° to 80° in all azimuthal angles when a white light is used in a structure of an IPS-LCD including a viewing angle compensation film according to one embodiment of the present invention, in which FIG. 27 is simulation results of seventh and eighth IPS-LCD structures, FIG. 28 is simulation results of ninth and tenth IPS-LCD structures, FIG. 29 is simulation results of eleventh and twelfth IPS-LCD structures, FIG. 30 is simulation results of thirteenth and fourteenth IPS-LCD structures, FIG. 31 is simulation results of fifteenth and sixteenth IPS-LCD structures, and FIG. 32 is simulation results of seventeenth and eighteenth IPS-LCD structures.

DISCLOSURE OF THE INVENTION

Figure 1:
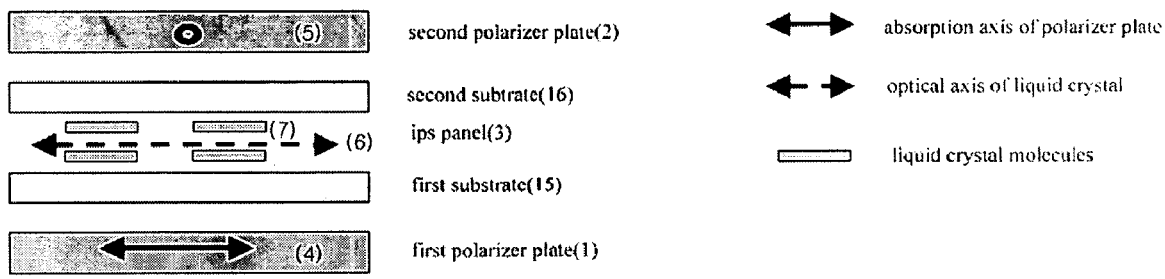
FIG. 1 is a view illustrating a basic structure of an IPS-LCD.

It is an object of the present invention to provide an IPS-LCD representing a superior contrast characteristic and a low color shift at a front and at a predetermined inclination angle of the IPS-LCD by minimizing light leakage in a black state at the predetermined inclination angle.

The viewing angle characteristic of the IPS-LCD may be lowered due to a dependency of a perpendicularity between the absorption axes of two polarizer plates), to the viewing angle and a dependency of a birefringence of an IPS-LCD panel to the viewing angle.

The present inventors have found that a +A-plate and a +C-plate are necessary to compensate for the above problems lowering the viewing angle characteristic of the IPS-LCD. Accordingly, the present inventors have designed two type retardation films of the +A-plate and +C-plate, thereby obtaining a wide viewing angle characteristic.

In addition, the present inventors have found that an optical axis direction of the +A-plate must be properly determined in match with an alignment order of the +A-plate and +C-plate positioned between a polarizer plate and an IPS-LCD panel. The present invention has been suggested on the basis of the above concepts.

Accordingly, the present invention provides an in-plane switching liquid crystal display (IPS-LCD) capable of solving the above-mentioned problems by using +A-plate and +C-plate.

In detail, the present invention provides an in-plane switching liquid crystal display comprising: a first polarizer plate; a liquid crystal cell, which is horizontally aligned and filled with liquid crystal of positive dielectric anisotropy ($\Delta \in > 0$), an optical axis of the liquid crystal filled in the liquid crystal cell being aligned in-plane in parallel to polarizer plate; and a second polarizer plate, wherein an absorption axis of the first polarizer plate is perpendicular to an absorption axis of the second polarizer plate, and the optical axis of the liquid crystal filled in the liquid crystal cell is parallel to the absorption axis of the first polarizer plate, wherein at least one +A-plate ($n_x > n_y = n_z$) and at least one +C-plate ($n_x = n_y < n_z$) are interposed between the polarizer plate and the liquid crystal cell in order to compensate for a viewing angle in a dark state, and an optical axis of the +A-plate is adjusted according to an alignment order of +A-plate(s) and +C-plate(s).

According to the preferred embodiment of the present invention, a pair of compensation films including the +A-plate and the +C-plate are aligned between the second polarizer plate (2) and the liquid crystal cell; and the optical axis of the +A-plate is aligned perpendicularly to an absorption axis (5) of the second polarizer plate if the +A-plate is adjacent to the second polarizer plate, or the optical axis of the +A-plate is aligned in parallel to the absorption axis (5) of the second polarizer plate if the +A-plate is adjacent to the liquid crystal cell (3). In addition, the optical axis of the +A-plate aligned between the first polarizer plate (1) and the liquid crystal cell (3) can be aligned in parallel to or in perpendicular to an absorption axis of the first polarizer plate.

When the IPS-LCD exclusively uses the polarizer plates, a contrast ratio at the inclination angle of 70° is equal to or less than 10:1. However, the IPS-LCD of the present invention using the +A-plate and the +C-plate may represent a minimum contrast ratio above 20:1, preferably 50:1, at the inclination angle of 70°.

Reference will now be made in detail to the preferred embodiments of the present invention.

FIG. 1 is a view illustrating a basic structure of an IPS-LCD.

Figure 2:
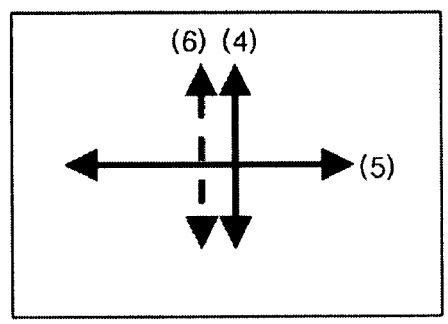
FIG. 2 is a view illustrating an alignment of an absorption axis of a polarizer plate and an optical axis of liquid crystal in IPS-LCD panel of FIG. 1.

The IPS-LCD includes a first polarizer plate 1, a second polarizer plate 2 and an IPS-LCD panel 3. An absorption axis 4 of the first polarizer plate 1 is aligned in perpendicular to the an absorption axis 5 of the second polarizer plate 2 and the absorption axis 4 of the first polarizer plate 1 is parallel to an optical axis 6 of the IPS-LCD panel 3. In FIG. 2, two absorption axes 4 and 5 of two polarizer plates and one optical axis 6 of one IPS-LCD panel are shown.

That is, the liquid crystal display using a compensation film according to the present invention includes the first polarizer plate 1, the IPS-LCD panel 3, which is horizontally aligned between two glass substrates 15 and 16 and includes a liquid crystal cell filled with liquid crystal of positive dielectric anisotropy ($\Delta \in > 0$), and the second polarizer plate 2. The optical axis 6 of the liquid crystal filled in the liquid crystal cell is aligned in-plane in parallel to the first and second polarizer plates 1 and 2. The absorption axis 4 of the first polarizer plate 1 is aligned in perpendicular to the absorption axis 5 of the second polarizer plate 2 and the absorption axis 4 of the first polarizer plate 1 is parallel to the optical axis 6 of the liquid crystal filled in the liquid crystal cell of the IPS-LCD panel 3. In addition, one of first and second substrates 15 and 16 includes an active matrix drive electrode having a pair of electrodes, which is formed on a surface of the substrate adjacent to a liquid crystal layer.

A retardation value of the liquid crystal cell of the IPS-LCD according to the present invention is preferably 200 nm to 450 nm at a wavelength of 550 nm.

A white state of the IPS-LCD can be obtained by (1) linearly polarizing light radiated from a backlight unit at an angle of 0° after passing through one polarizer plate, (2) rotating the 0°-linearly polarized light into the 90°-linearly polarized light after passing through a liquid crystal cell, and then (3) transmitting the 90°-linearly polarized light through the other polarizer plate. In order to allow the 0°-polarized light to be converted into the 90°-polarized light, the liquid crystal cell must have a retardation value corresponding to a half of a wavelength of an incident light. In addition, it is also possible to use a waveguide characteristic of a liquid crystal layer of a liquid crystal cell in a reverse-TN (twisted nematic) IPS-LCD, in which the retardation value of the liquid crystal cell is set to 400 nm. The retardation value of the liquid crystal cell may vary depending on modes of the IPS-LCD.

The LCD according to the present invention may align the liquid crystal in multi-directions, or the liquid crystal may be divided into multi-regions by voltage applied thereto.

The LCDs can be classified into IPS (In-Plain Switching) LCDs, S-IPS (Super-In-Plan Switching) LCDs and FFS (Fringe Field Switching) LCDs according to modes of the active matrix drive electrode including a pair of electrodes. In the present invention, the IPS-LCD may include the S-IPS LCD, the FFS LCD, and a reverse TN IPS LCD.

According to the present invention, the IPS-LCD uses a +A-plate and a +C plate in order to compensate for a viewing angle thereof. When IPS-LCD uses the +A-plate combined with the +C plate in order to compensate for the viewing angle of the IPS-LCD, a wide viewing angle characteristic can be obtained.

Figure 3:
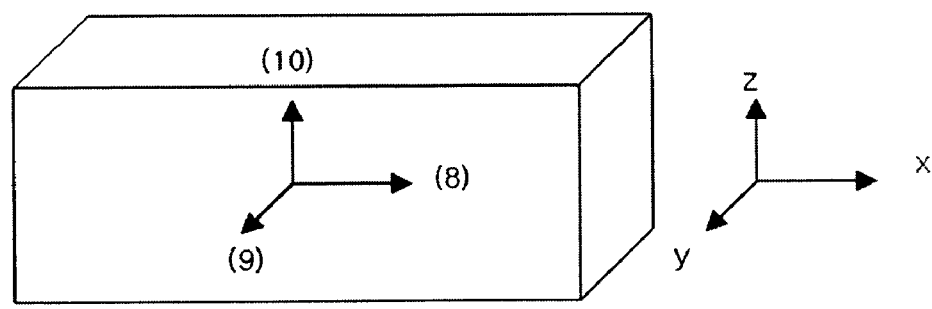
FIG. 3 is a view illustrating a refractive index of a retardation film.

FIG. 3 illustrates a refractive index of a retardation film used for compensating for a viewing angle of the IPS-LCD. Referring to FIG. 3, an in-plane refractive index in an x-axis direction is $n_x$(8), an in-plane refractive index in a y-axis direction is $n_y$(9), and a thickness refractive index in a z-axis direction is $n_z$(10). In addition, the characteristic of the retardation film depends on the refractive index.

A uniaxial retardation film represents mutually different refractive indexes in two-axis directions among x-axis, y-axis and z-axis directions. The uniaxial retardation film is defined as follows:

(1) The +A-plate satisfies an equation of $n_x > n_y = n_z$, and an in-plane retardation value thereof can be defined as following Equation 1 by using a difference between two in-plane refractive indexes and a thickness of a film.

$$R_{in} = d \times (n_x - n_y),\qquad\text{Equation 1}$$

wherein d is a thickness of a film.

The +A-plate has a thickness retardation value of almost 0 and a positive in-plane retardation value.

(2) The +C-plate satisfies an equation of $n_x = n_y < n_z$, and a thickness retardation value thereof can be defined as following Equation 2 by using a thickness of a film and a difference between an in-plane refractive index and a thickness refractive index.

$$R_{th} = d \times (n_z - n_y),$$  Equation 2 wherein d is a thickness of a film.

The +C-plate 11 has an in-plane retardation value of almost 0 and a positive thickness retardation value.

In order to compensate for the viewing angle of the IPS-LCD, the +A-plate preferably has an in-plane retardation value of 30 nm to 500 nm at a wavelength of 550 nm, and the +C-plate preferably has a thickness retardation value of 30 nm to 500 nm at a wavelength of 550 nm.

Light leakage may occur in the black state of the IPS-LCD mainly because of a polarizer plate and partially because of an IPS-LCD panel. Therefore, a range of the retardation value required for compensating for the IPS-LCD can be obtained by slightly expanding the retardation value such that the light leakage of the polarizer plate can be compensated. That is, the range of the retardation values for the +A-plate and the +C-plate required for minimizing the light leakage generated from two polarizer plates with the absorption axes thereof aligned perpendicularly to each other, is 50 nm to 300 nm, respectively. In addition, when taking the IPS-LCD panel into consideration, the above range can be slightly expanded. For this reason, the range of the retardation values for the +A-plate and the +C-plate required for compensating for the viewing angle of the IPS-LCD is 30 nm to 500 nm, respectively.

The wavelength dispersion characteristic of the retardation film includes normal wavelength dispersion, flat wavelength dispersion, and reverse wavelength dispersion.

FIGS. 4 to 9 and 15 to 26 illustrate structures of a viewing angle compensation film including a +C-plate 11 and a +A-plate 12 used in an IPS-LCD according to the present invention.

An IPS-LCD panel 3 is interposed between polarizer plates, wherein liquid crystal molecules 7 are aligned in parallel to IPS-LCD panel substrates 15 and 16 and in a rubbing direction, which is formed on the substrates by surface-treating the substrates such that liquid crystal molecules are aligned in one direction. In order to obtain the viewing angle compensation function, retardation films must be interposed between the IPS-LCD panel 3 and polarizer plates 1 and 2. An optical axis (or slow axis) 13 of the retardation film is aligned in perpendicular to or parallel to an absorption axis 5 of an adjacent polarizer plate. Since an optical axis of the +C-plate is perpendicular to the polarizer plate, it may not directly relate to the viewing angle characteristic. That is, only an angle formed between the optical axis of the +A-plate and the absorption axis of the polarizer plate may exert an influence upon the viewing angle characteristic.

The optical axis direction of the +A-plate is determined according to an alignment order of the retardation films.

When designing a viewing angle compensation film of the IPS-LCD, the present invention considers that an internal protective film of a polarizer plate has a function of the retardation film while taking a case in which the internal protective film has a thickness retardation value and a case in which the internal protective film has no thickness retardation value into consideration. Design values of the +A-plate and +C-plate with the internal protective film of the polarizer plate having the thickness retardation value are different from those of the +A-plate and +C-plate with the internal protective film having no thickness retardation value. Tables 1 to 10 show a variation in the design values of the +A-plate and +C-plate according to the internal protective films.

According to a first embodiment of the present invention, there is provided an LCD including a first polarizer plate 1, an IPS panel liquid crystal cell 3, a +C-plate 11, an A-plate 12, and a second polarizer plate, which are sequentially aligned and in which an optical axis 13 of the A-plate is perpendicular to an absorption axis 5 of the second polarizer plate.

When the A-plate is adjacent to the polarizer plate and the +C-plate is positioned next to the A-plate, the viewing angle can be compensated only when the optical axis of the A-plate is perpendicular to the absorption axis of the adjacent polarizer plate. That is, the viewing angle characteristic may be lowered if the optical axis of the A-plate is aligned in parallel to the absorption axis of the adjacent polarizer plate.

At this time, the A-plate 12 preferably has an in-plane retardation value in a range of 30 nm to 500 nm at a wavelength of 550 nm, and the +C-plate 11 preferably has a thickness retardation value in a range of 30 nm to 500 nm at a wavelength of 550 nm.

Figure 4:
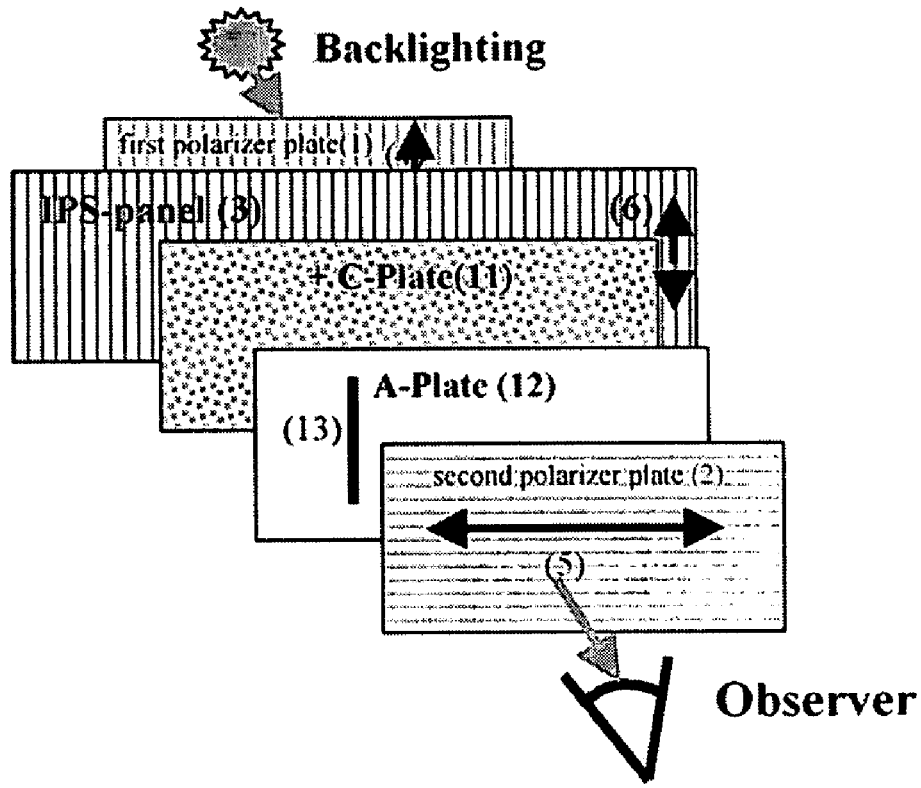
Figure 5:
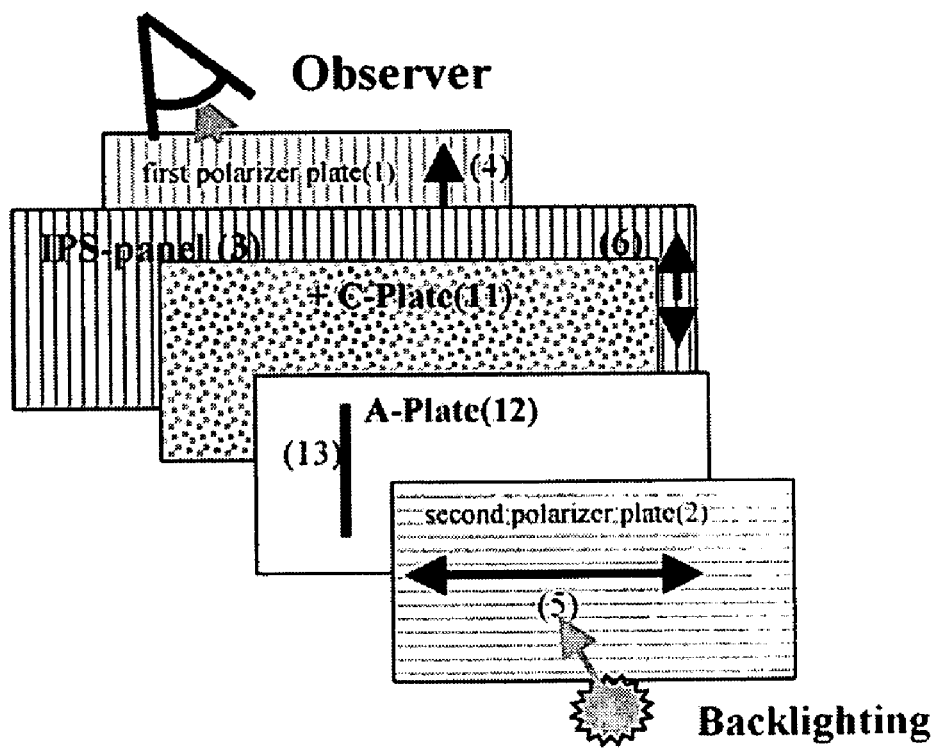

FIG. 4 shows a first IPS-LCD structure including a compensation film according to the first embodiment of the present invention and FIG. 5 shows a second IPS-LCD structure including a compensation film according to the first embodiment of the present invention.

The first and second IPS-LCD structures shown in FIGS. 4 and 5 are substantially identical to each other, except for light sources thereof, which are aligned in opposition to each other. The first and second IPS-LCD structures shown in FIGS. 4 and 5 represent the same viewing angle characteristics.

Figure 10:
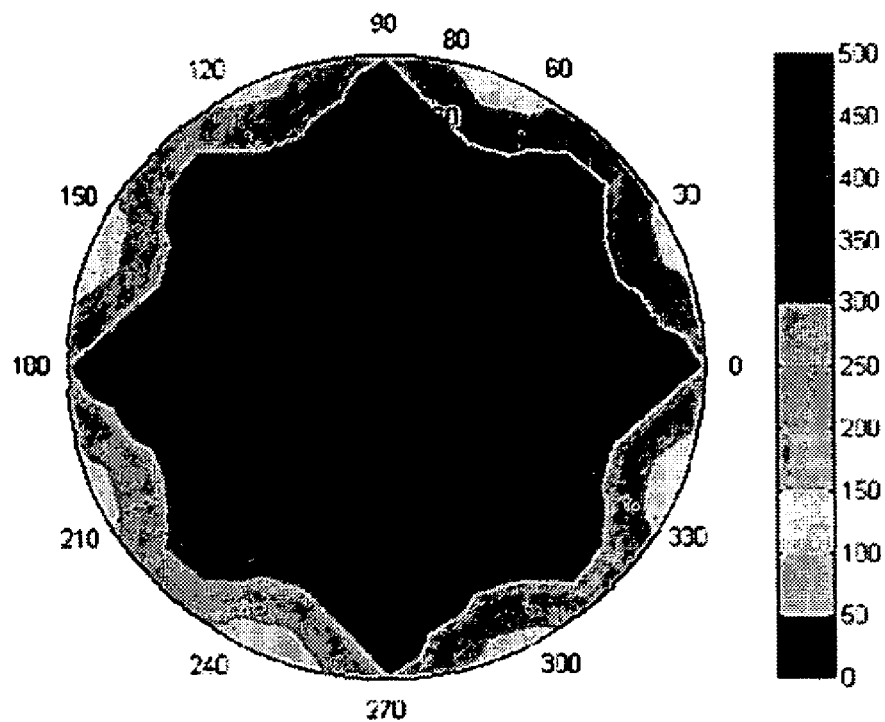

FIG. 10 and Table 1 show a simulation result when practical design values of a retardation film are applied to the IPS-LCD structure shown in FIG. 4.

TABLE 1

| Internal protective film of 1st polarizer plate | IPS-LCD | Retardation value of +C-plate (nm) | Retardation value of A-plate (nm) | Internal protective film of 2nd polarizer plate | Minimum contrast ratio value at inclination angle of 70° |
|---|---|---|---|---|---|
| COP | 290 nm | 94 | 150 | COP | 167 |
|  |  | 99 | — | A-COP $R_{in}$ = 140 nm | 167 |
|  |  | 99 | 110 | 40 μm TAC | 170 |
|  |  | 116 | 80 | 80 μm TAC | 150 |
|  |  | 174 | 53 | PNB $R_{th}$ = −130 nm | 100 |

TABLE 1-continued

| Internal protective film of 1st polarizer plate | IPS-LCD | Retardation value of +C-plate (nm) | Retardation value of A-plate (nm) | Internal protective film of 2nd polarizer plate | Minimum contrast ratio value at inclination angle of 70° |
|---|---|---|---|---|---|
| 40 μm TAC | | 54 | 132 | COP | 75 |
| | | 70 | 110 | 40 μm TAC | 75 |
| | | 100 | 90 | 80 μm TAC | 60 |
| 80 μm TAC | | 35 | 137 | COP | 33 |
| | | 35 | 100 | 40 μm TAC | 33 |
| | | 50 | 70 | 80 μm TAC | 30 |

Table 1 shows the contrast ratio value (contrast ratio value of the white state to the black state) in the IPS-LCD structure obtained through the simulation at the inclination angle of 70°.

The contrast ratio value is an index representing a degree of definition for an image, and a higher contrast ratio value allows a higher definition image. The simulation is carried out at the inclination angle of 70° because the contrast characteristic of the IPS-LCD is greatly degraded at the inclination angle of 70°. When the IPS-LCD does not use the viewing angle compensation film, the minimum contrast ratio value of the IPS-LCD is identical to or less than 10:1. Accordingly, Table 1 shows an improved minimum contrast ratio value of the IPS-LCD at the inclination angle of 70°, which means that the contrast characteristic of the IPS-LCD may be improved at all viewing angles.

Figure 11:
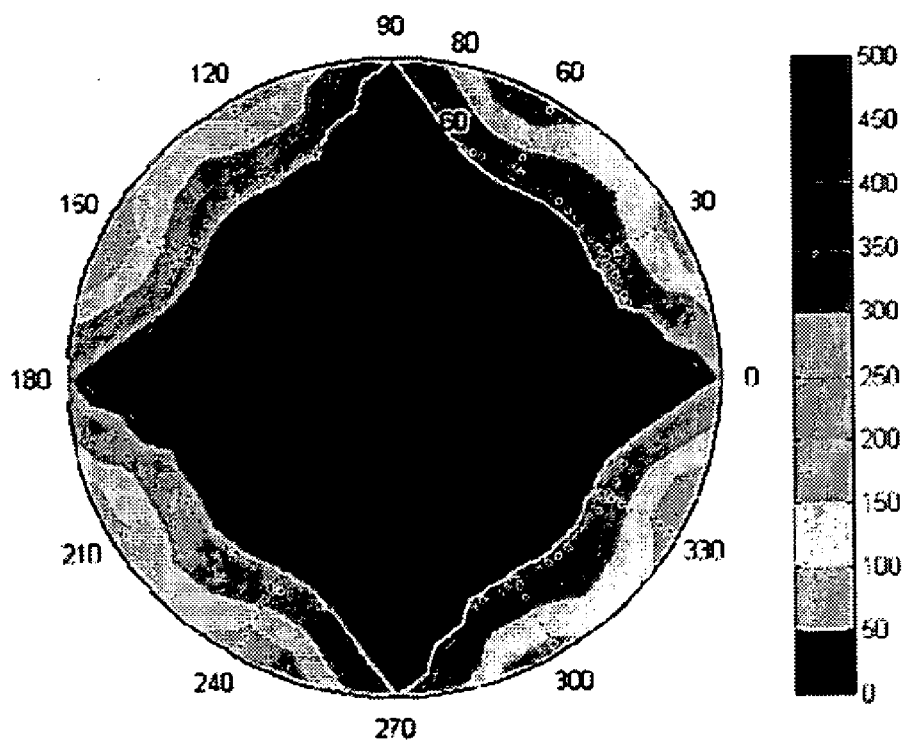

FIG. 11 shows a simulation result for the contrast characteristic when practical design values of a retardation film are applied to the IPS-LCD structure shown in FIG. 5.

According to a second embodiment of the present invention, there is provided an LCD including a first polarizer plate 1, an IPS panel liquid crystal cell 3, an A-plate 12, a +C-plate 11, and a second polarizer plate, which are sequentially aligned and in which an optical axis 13 of the A-plate is parallel to an absorption axis 5 of the second polarizer plate.

Since the IPS-LCD panel rarely exerts an influence upon the viewing angle characteristic, the above alignment is substantially identical to an alignment in which the +A-plate and the +C-plate are aligned between the first and second polarizer plates. In addition, since the viewing angle compensation function can be obtained when the optical axis of the A-plate is aligned perpendicularly to the absorption axis of an adjacent polarizer plate, the optical axis of the A-plate must be aligned perpendicularly to the absorption axis of the first polarizer plate in order to act as a viewing angle compensation film.

At this time, the A-plate 12 preferably has an in-plane retardation value in a range of 50 nm to 200 nm at a wavelength of 550 nm, and the +C-plate 11 preferably has a thickness retardation value in a range of 80 nm to 300 nm at a wavelength of 550 nm.

In order to ideally compensate for light leakage of the polarizer plates, the A-plate preferably has an in-plane retardation value of about 130 nm, and the +C-plate preferably has a thickness retardation value of 100–200 nm. If the polarizer plate internal protective film acts as a retardation film having a negative thickness retardation value, the A-plate preferably has a retardation value of about 80 nm, and the +C-plate preferably has a retardation value of 100–200 nm. Since the IPS-LCD panel has a retardation value, it is preferable that the +A-plate has a retardation value of 50 nm to 200 nm according to the retardation value of the +C-plate and the +C-plate has a thickness retardation value of 80 nm to 300 nm according to the in-plane retardation value of the +A-plate(see Table 2).

Figure 6:
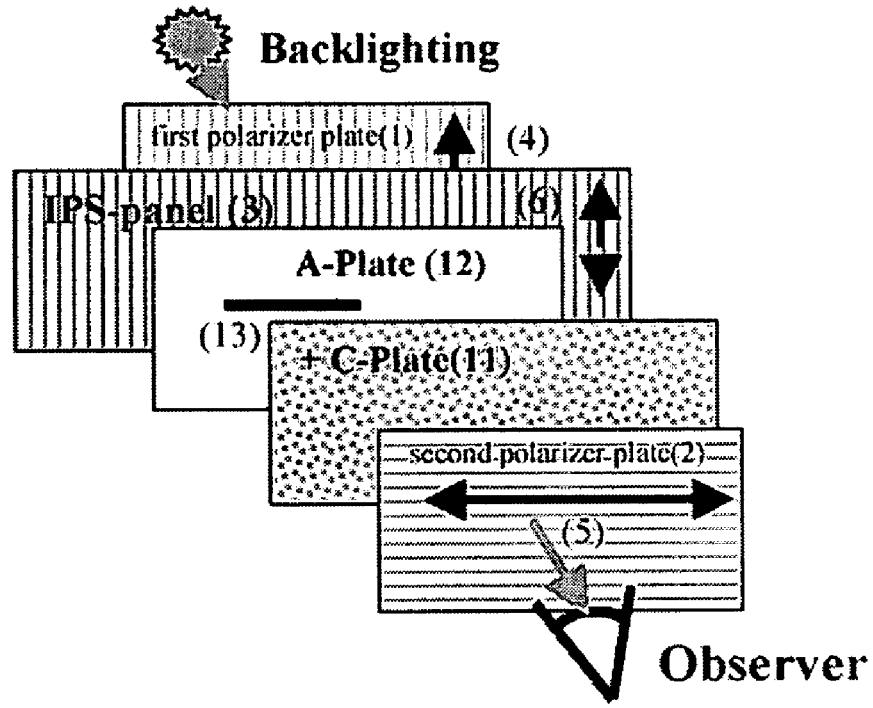
Figure 7:
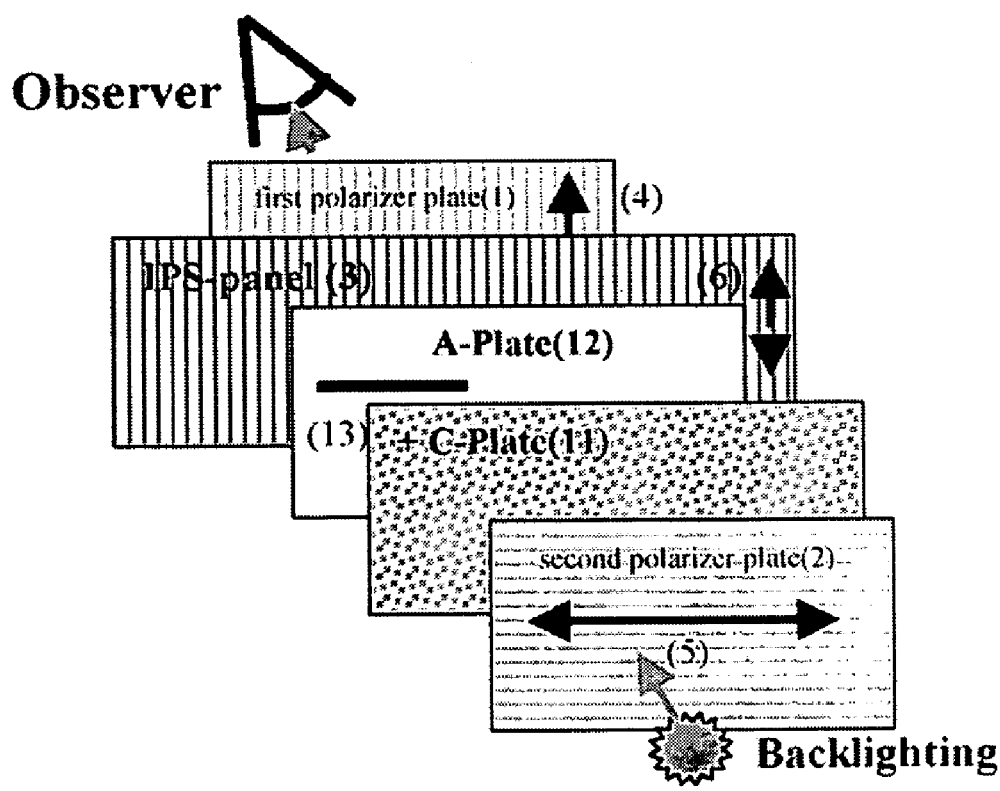

FIG. 6 shows a third IPS-LCD structure including a compensation film according to the second embodiment of the present invention and FIG. 7 shows a fourth IPS-LCD structure including a compensation film according to the second embodiment of the present invention.

The third and fourth IPS-LCD structures shown in FIGS. 6 and 7 are substantially identical to each other, except for light sources thereof, which are aligned in opposition to each other. The third and fourth IPS-LCD structures shown in FIGS. 6 and 7 represent the same viewing angle characteristics.

Figure 12:
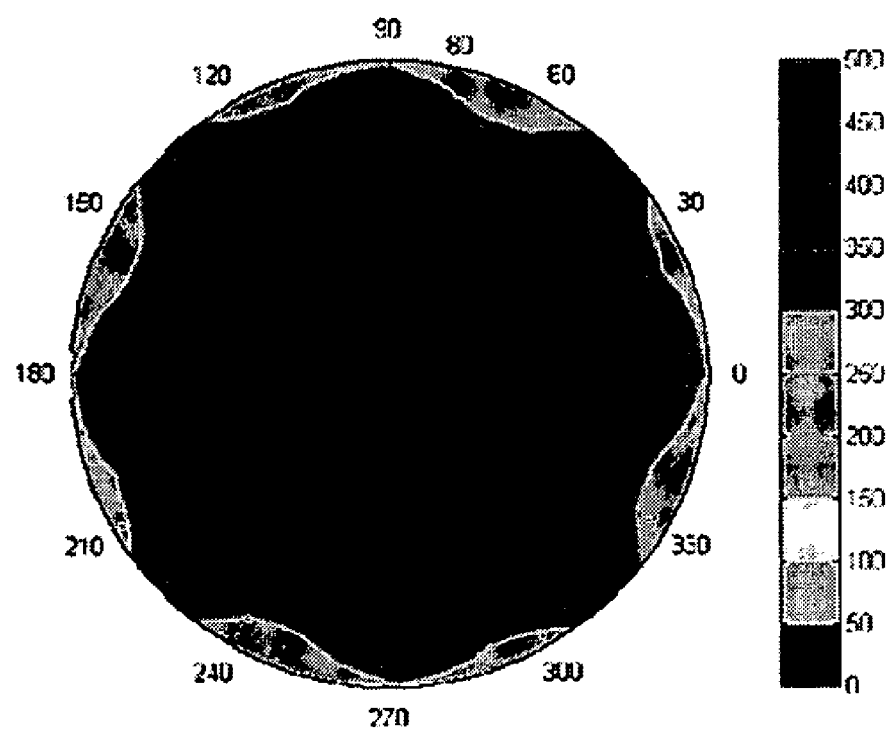

FIG. 12 and Table 2 show a simulation result for the contrast characteristic when practical design values of a retardation film are applied to the IPS-LCD structure shown in FIG. 6.

TABLE 2

| Internal protective film of 1st polarizer plate | IPS-LCD | Retardation value of A-plate (nm) | Retardation value of +C-plate (nm) | Internal protective film of 2nd polarizer plate | Minimum contrast ratio value at inclination angle of 70° |
|---|---|---|---|---|---|
| COP | 290 nm | 148 | 91 | COP | 195 |
| | | 148 | 126 | 40 μm TAC | 187 |
| | | 148 | 164 | 80 μm TAC | 176 |
| | | 148 | 237 | PNB $R_{th} = -130$ nm | 163 |

TABLE 2-continued

| Internal protective film of 1st polarizer plate | IPS-LCD | Retardation value of A-plate (nm) | Retardation value of +C-plate (nm) | Internal protective film of 2nd polarizer plate | Minimum contrast ratio value at inclination angle of 70° |
|---|---|---|---|---|---|
| 40 μm TAC | | 180 | 89 | COP | 75 |
| | | 180 | 161 | COP | 68 |
| | | 176 | 234 | PNB $R_{th} = -130$ nm | 62 |
| 80 μm TAC | | 182 | 89 | COP | 29 |
| | | 182 | 163 | 80 μm TAC | 27 |

Figure 13:
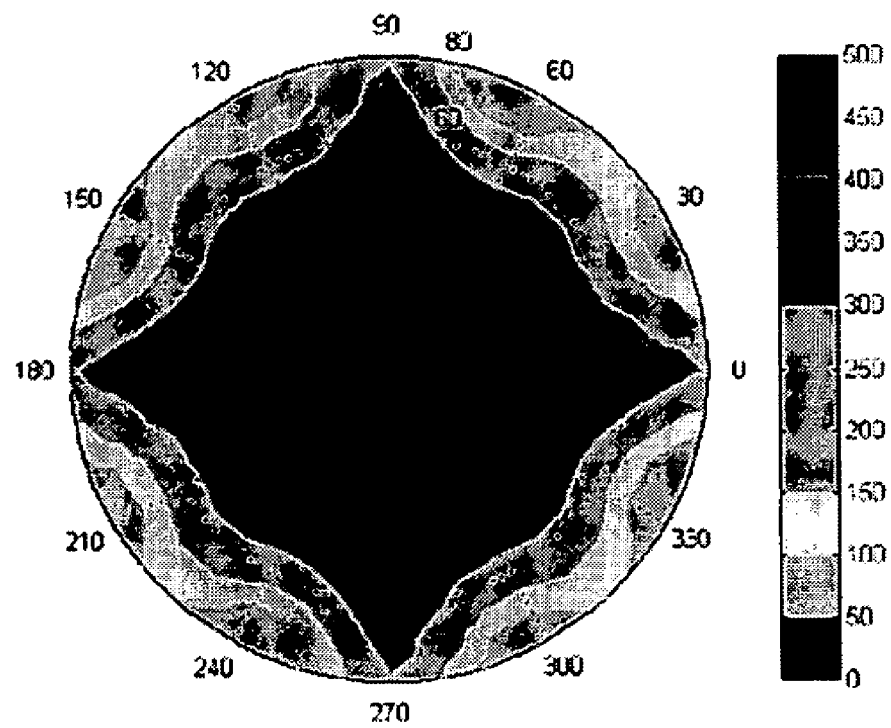

FIG. 13 and Table 3 show a simulation result for the contrast characteristic when practical design values of a retardation film are applied to the IPS-LCD structure shown in FIG. 7.

TABLE 3

| Internal protective film of 1st polarizer plate | IPS-LCD | Retardation value of A-plate (nm) | Retardation value of +C-plate (nm) | Internal protective film of 2nd polarizer plate | Minimum contrast ratio value at inclination angle of 70° |
|---|---|---|---|---|---|
| 40 μm TAC | 259 nm | 170 | 175 | 80 μm TAC | 78 |
| | 290 nm | 180 | 161 | | 78 |
| | 330 nm | 176 | 150 | | 83 |

Although the first and second embodiments of the present invention illustrate that the A-plate and the +C-plate are interposed between the second polarizer plate and the IPS-LCD liquid cell, it is also possible to further align the A-plate and/or the +C-plate between the first polarizer plate and the IPS-LCD liquid cell as represented in third to ninth embodiments of the present invention.

According to the third embodiment of the present invention, there is provided an LCD including a first polarizer plate 1, a first +C-plate 11, an IPS panel liquid crystal cell 3, an A-plate 12, a second +C-plate 14, and a second polarizer plate, which are sequentially aligned and in which an optical axis 13 of the A-plate is parallel to an absorption axis 5 of the second polarizer plate.

In this case, the A-plate 12 preferably has a retardation value in a range of 50 nm to 200 nm at a wavelength of 550 nm. In order to ideally compensate for light leakage of the polarizer plates, the A-plate preferably has a retardation value of about 130 nm. If the polarizer plate internal protective film acts as a retardation film having a negative thickness retardation value, the A-plate preferably has a retardation value of about 80 nm. Since the IPS-LCD panel has a retardation value, it is preferable that the retardation value of the A-plate has 50 nm to 200 nm according to the thickness retardation value(see Table 4).

In addition, the first +C-plate 11 preferably has a retardation value in a range of 10 nm to 400 nm at a wavelength of 550 nm. In order to ideally compensate for light leakage of the polarizer plates, the A-plate preferably has a retardation value of about 130 nm and the +C-plate preferably has a thickness retardation value of 100 to 200 nm. If the polarizer plate internal protective film acts as a retardation film having a negative thickness retardation value, the A-plate preferably has a retardation value of about 80 nm and the +C-plate preferably has a retardation value of 100 to 200 nm. Since the IPS-LCD panel has a retardation value, it is preferable that the +C-plate has a thickness retardation value of 80 nm to 300 nm according to the in-plane retardation value of the +A-plate. If the polarizer plate internal protective film has a great negative thickness retardation value, it is preferable to use a +C-plate having a thickness retardation value of 10 nm to 400 (see Table 4).

The second +C-plate 14 preferably has a retardation value in a range of 90 nm to 400 nm at a wavelength of 550 nm (see Table 4).

As can be understood from the simulation result shown in Table 4, the superior contrast characteristic is represented when the second +C-plate 14 has a retardation value in a range of 90 nm to 400 nm at a wavelength of 550 nm.

Figure 8:
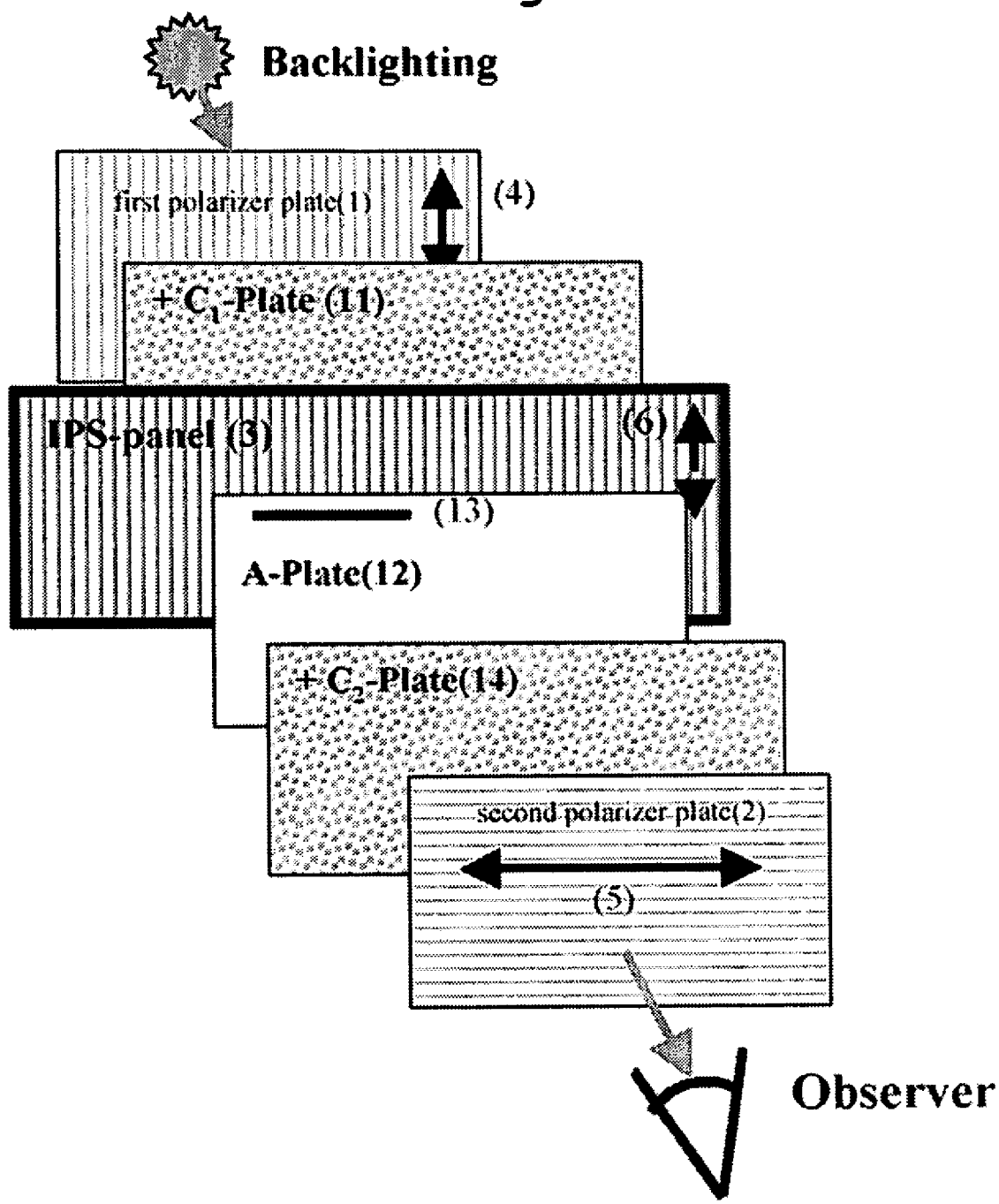
Figure 9:
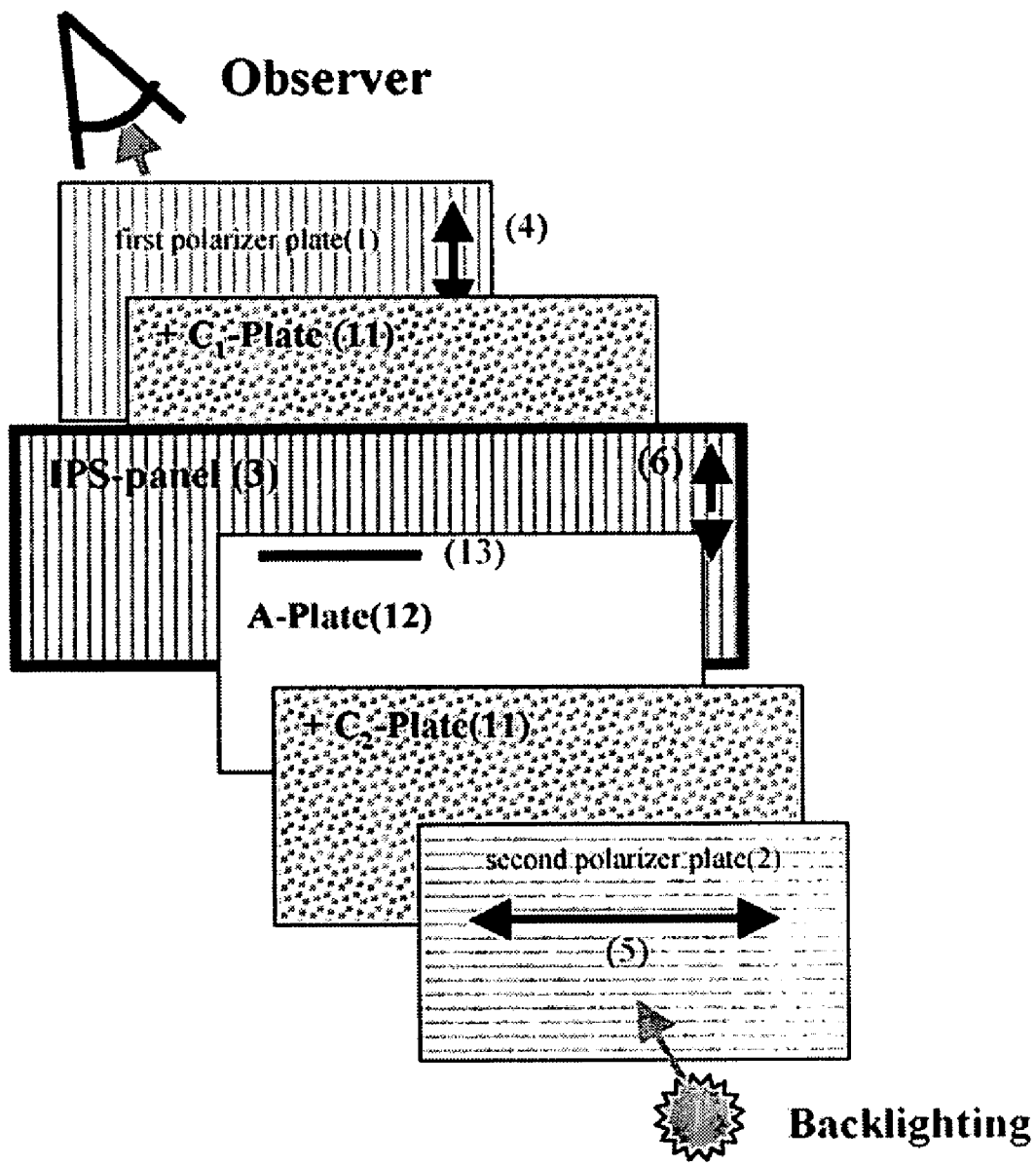

FIG. 8 shows a fifth IPS-LCD structure including a compensation film according to the third embodiment of the present invention and FIG. 9 shows a sixth IPS-LCD structure including a compensation film according to the third embodiment of the present invention.

The fifth and sixth IPS-LCD structures shown in FIGS. 8 and 9 are substantially identical to each other, except for light sources thereof, which are aligned in opposition to each other. The fifth and sixth IPS-LCD structures shown in FIGS. 8 and 9 represent the same viewing angle characteristics.

Figure 14:
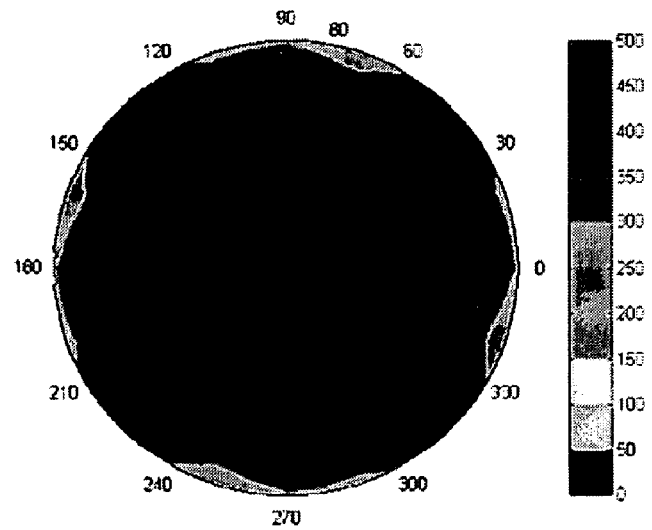

FIG. 14 and Table 4 show a simulation result for the contrast characteristic when practical design values of a retardation film are applied to the IPS-LCD structure shown in FIG. 8.

TABLE 4

| Internal protective film of 1st polarizer plate | Retardation value of +C-plate (nm) | IPS-LCD | Retardation value of A-plate (nm) | Retardation value of +C-plate (nm) | Internal protective film of 2nd polarizer plate | Minimum contrast ratio value at inclination angle of 70° |
|---|---|---|---|---|---|---|
| COP | 10 | 290 nm | 130 | 98 | COP | 160 |
|  | 10 |  | 130 | 170 | 80 μm TAC | 150 |
|  | 50 |  | 104 | 120 | COP | 160 |
|  | 100 |  | 80 | 145 | COP | 125 |
|  | 100 |  | 80 | 218 | 80 μm TAC | 125 |
| 80 μm TAC | 100 |  | 125 | 173 | 80 μm TAC | 214 |
|  | 150 |  | 92 | 202 | 80 μm TAC | 150 |
| PNB | 300 |  | 72 | 230 | 80 μm TAC | 100 |
| $R_{th}$ = −160 nm | 300 |  | 72 | 305 | PNB $R_{th}$ = −160 nm | 100 |

In the IPS-LCD structure according to the present invention, a relative position between two polarizer plates and liquid crystal is only important, regardless of the relative positions of an observer and a backlight unit.

According to the fourth embodiment of the present invention, there is provided an LCD including a first polarizer plate 1, a first A-plate 11, an IPS panel liquid crystal cell 3, a second A-plate 13, a +C-plate 15, and a second polarizer plate, which are sequentially aligned and in which an optical axis 12 of the first A-plate 11 is parallel to an absorption axis 4 of the first polarizer plate and an optical axis 14 of the second A-plate 13 is parallel to an absorption axis of the second polarizer plate.

In this case, the +C-plate 13 preferably has a retardation value in a range of 50 nm to 400 nm at a wavelength of 550 nm.

In addition, the first A-plate 11 preferably has a retardation value in a range of 1 nm to 500 nm at a wavelength of 550 nm and the second A-plate 13 preferably has a retardation value in a range of 1 nm to 500 nm at a wavelength of 550 nm.

Figure 15:
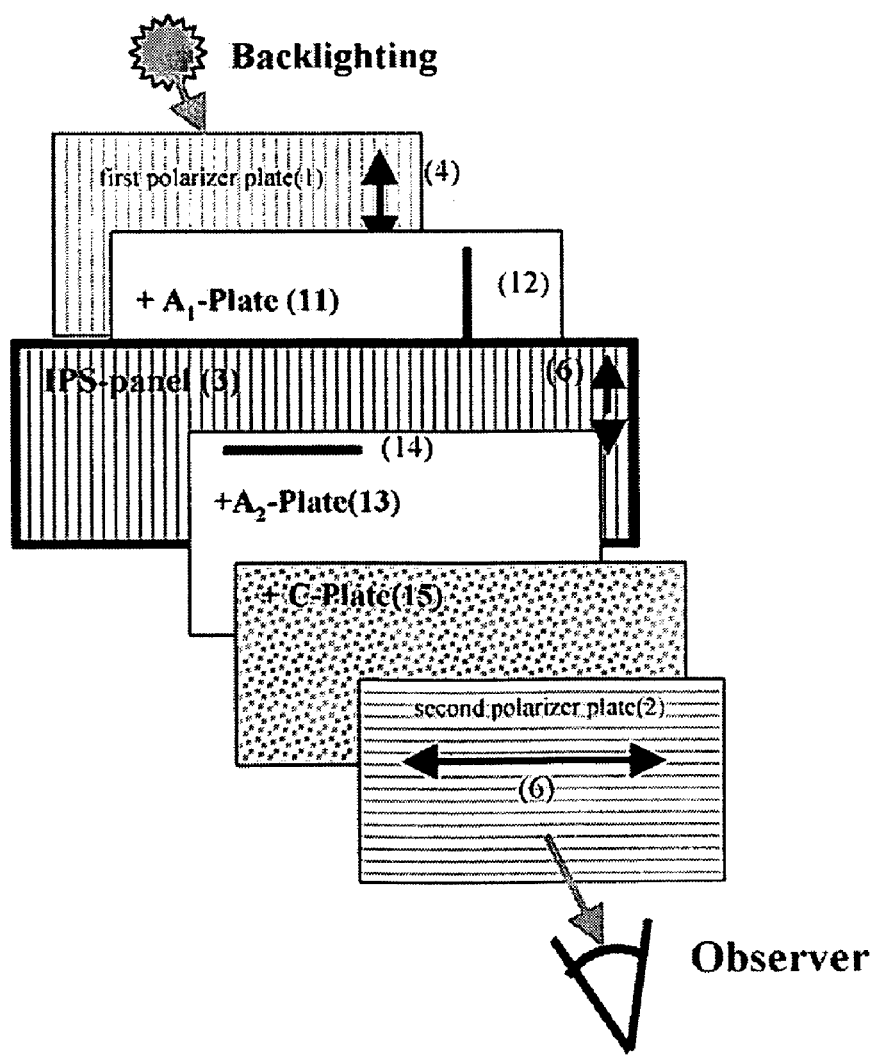
Figure 16:
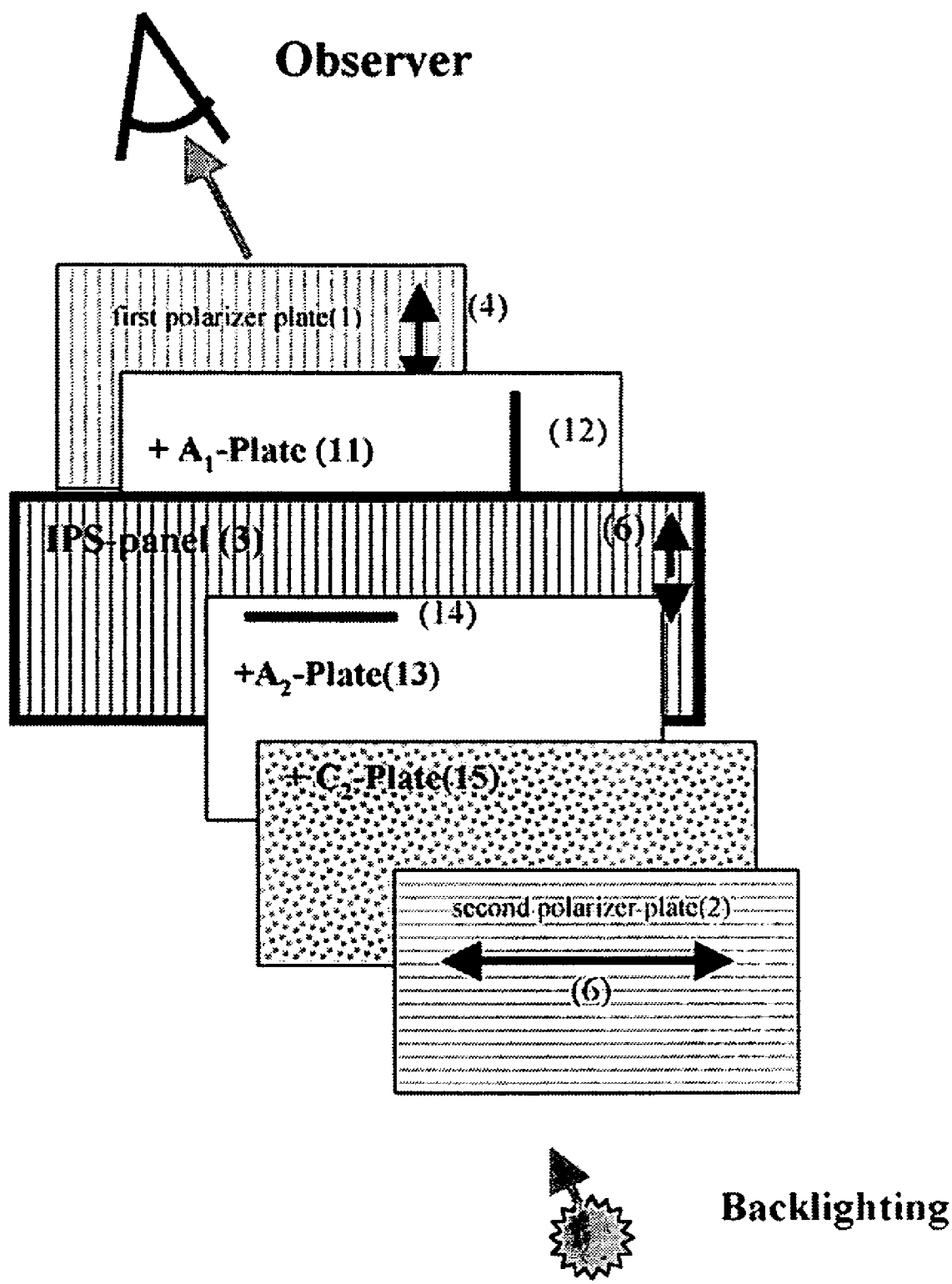

FIG. 15 shows a seventh IPS-LCD structure including a compensation film according to the fourth embodiment of the present invention and FIG. 16 shows an eighth IPS-LCD structure including a compensation film according to the fourth embodiment of the present invention.

The seventh and eighth IPS-LCD structures shown in FIGS. 15 and 16 are substantially identical to each other, except for light sources thereof, which are aligned in opposition to each other. The seventh and eighth IPS-LCD structures shown in FIGS. 15 and 16 represent the same viewing angle characteristics.

Figure 27:
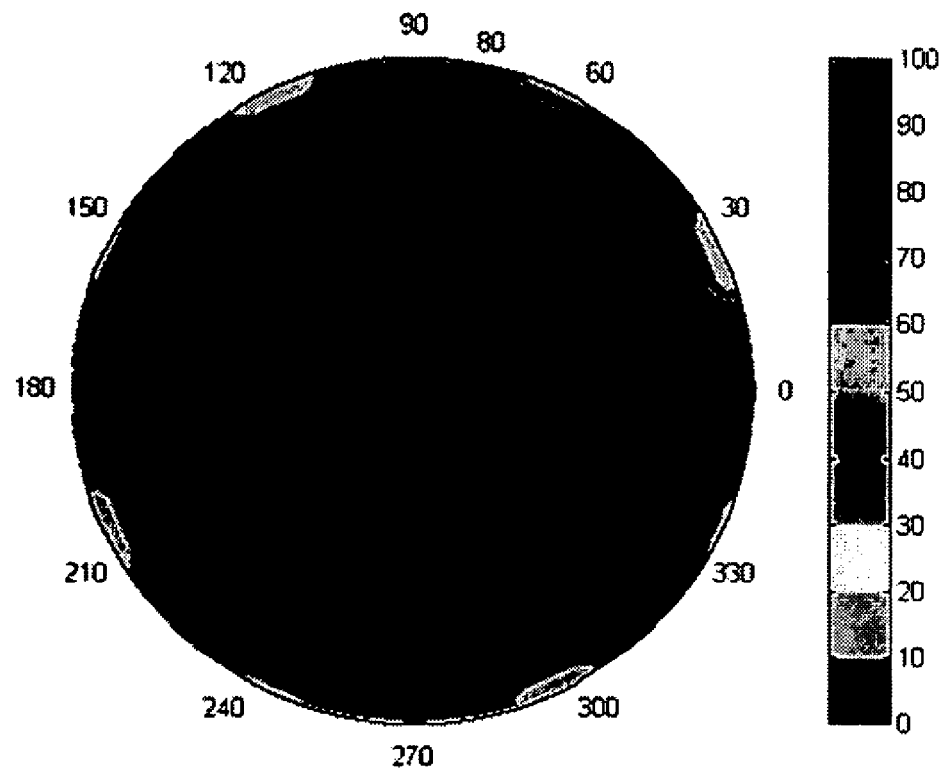

FIG. 27 and Table 5 show a simulation result for the contrast characteristic when practical design values of a retardation film are applied to the IPS-LCD structures shown in FIGS. 15 and 16.

TABLE 5

| Internal protective film of 1st polarizer plate | A-plate | IPS-LCD | A-plate | +C-plate | Internal protective film of 2nd polarizer plate | Minimum contrast ratio value at inclination angle of 70° |
|---|---|---|---|---|---|---|
| 80 μm TAC | 160 | 310 nm | 100 | 127 | 80 μm TAC | 27:1 |
| 40 μm TAC | 150 |  | 120 | 150 |  | 120:1 |
| Isotropic COP | 80 |  | 130 | 170 |  | 125:1 |
| 80 μm TAC | 150 |  | 120 | 90 | 40 μm TAC | 28:1 |
| 40 μm TAC | 210 |  | 120 | 120 |  | 120:1 |
| Isotropic COP | 0 |  | 140 | 130 |  | 139:1 |
| 80 μm TAC | 80 |  | 170 | 50 | Isotropic COP | 34:1 |
| 40 μm TAC | 80 |  | 160 | 60 |  | 80:1 |
| Isotropic COP | 130 |  | 140 | 110 |  | 92:1 |

According to the fifth embodiment of the present invention, there is provided an LCD including a first polarizer plate 1, a first +C-plate 16, a first +A-plate 11, an IPS panel liquid crystal cell 3, a second +A-plate 13, a second +C-plate 15, and a second polarizer plate, which are sequentially aligned and in which an optical axis 12 of the first A-plate is parallel to an absorption axis 4 of the first polarizer plate and an optical axis 14 of the second A-plate is parallel to an absorption axis 6 of the second polarizer plate.

In this case, the first +C-plate 16 preferably has a retardation value in a range of 1 nm to 500 nm at a wavelength of 550 nm and the second +C-plate 15 preferably has a retardation value in a range of 1 nm to 400 nm at a wavelength of 550 nm.

In addition, the first A-plate 11 preferably has a retardation value in a range of 1 nm to 500 nm at a wavelength of 550 nm and the second A-plate 13 preferably has a retardation value in a range of 1 nm to 500 nm at a wavelength of 550 nm.

Figure 17:
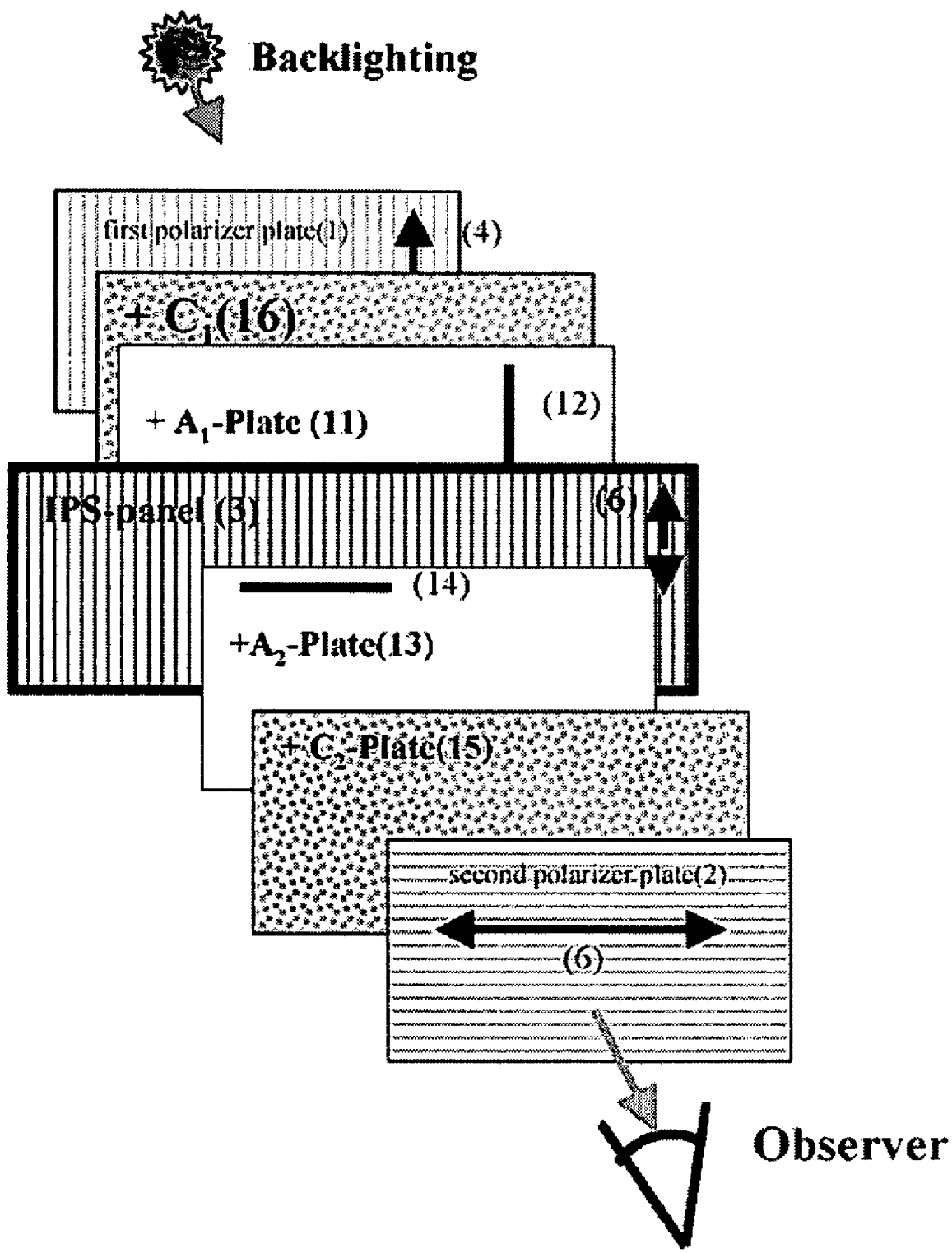
Figure 18:
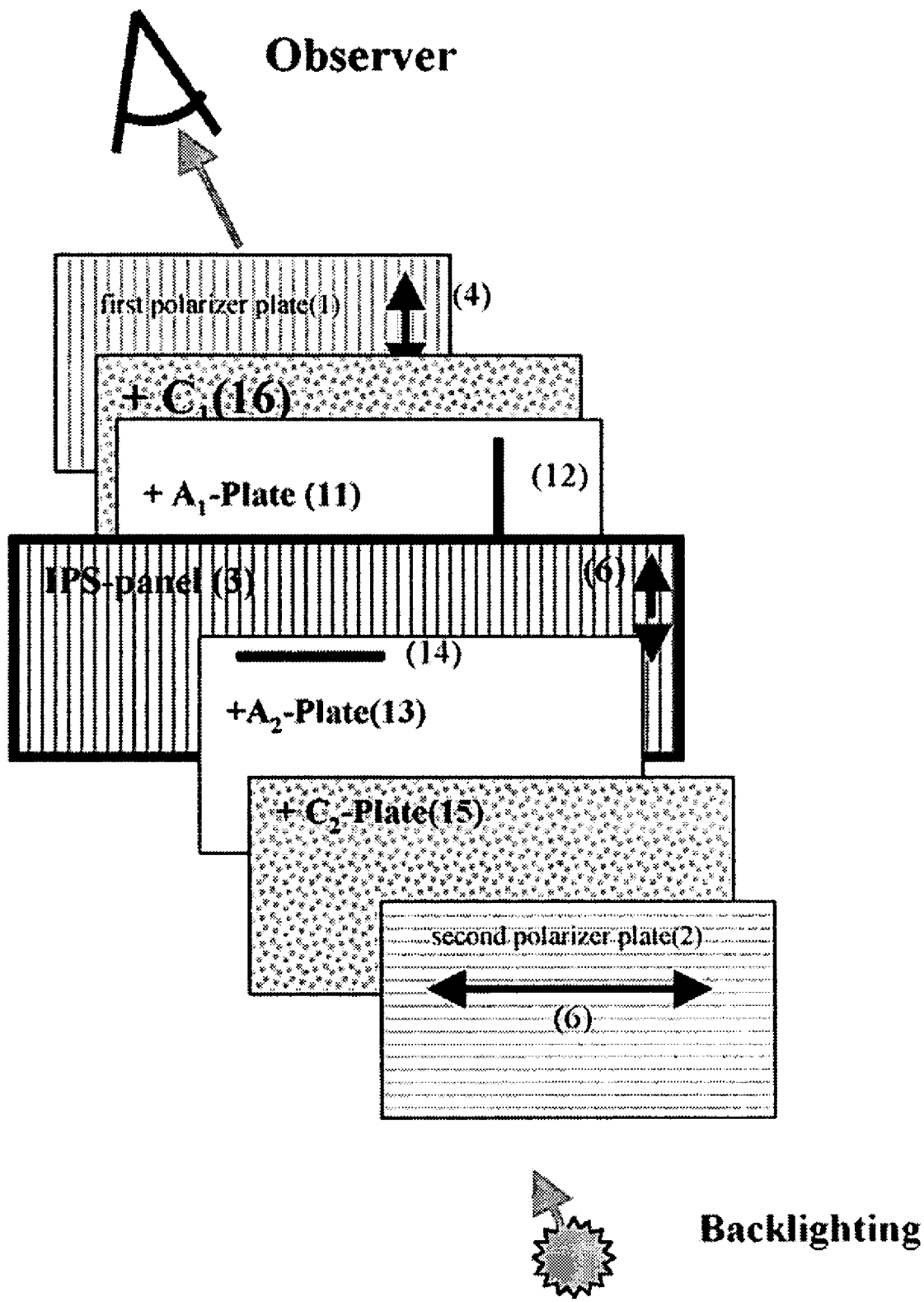

FIG. 17 shows a ninth IPS-LCD structure including a compensation film according to the fifth embodiment of the present invention and FIG. 18 shows a tenth IPS-LCD structure including a compensation film according to the fifth embodiment of the present invention. The ninth and tenth IPS-LCD structures shown in FIGS. 17 and 18 are substantially identical to each other, except for light sources thereof, which are aligned in opposition to each other. The ninth and tenth IPS-LCD structures shown in FIGS. 17 and 18 represent the same viewing angle characteristics.

Figure 28:
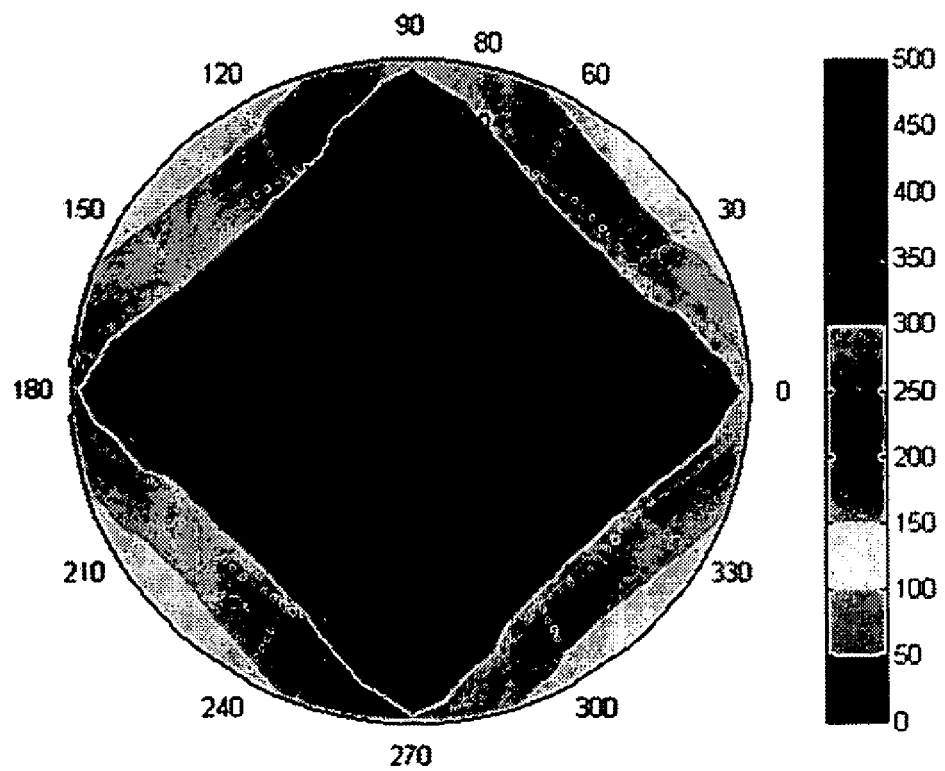

FIG. 28 and Table 6 show a simulation result for the contrast characteristic when practical design values of a retardation film are applied to the IPS-LCD structures shown in FIGS. 17 and 18.

In this case, the first +C-plate 16 preferably has a retardation value in a range of 1 nm to 500 nm at a wavelength of 550 nm and the second +C-plate 15 preferably has a retardation value in a range of 1 nm to 500 nm at a wavelength of 550 nm.

In addition, the first A-plate 11 preferably has a retardation value in a range of 1 nm to 500 nm at a wavelength of 550 nm and the second A-plate 13 preferably has a retardation value in a range of 1 nm to 500 nm at a wavelength of 550 nm.

Figure 19:
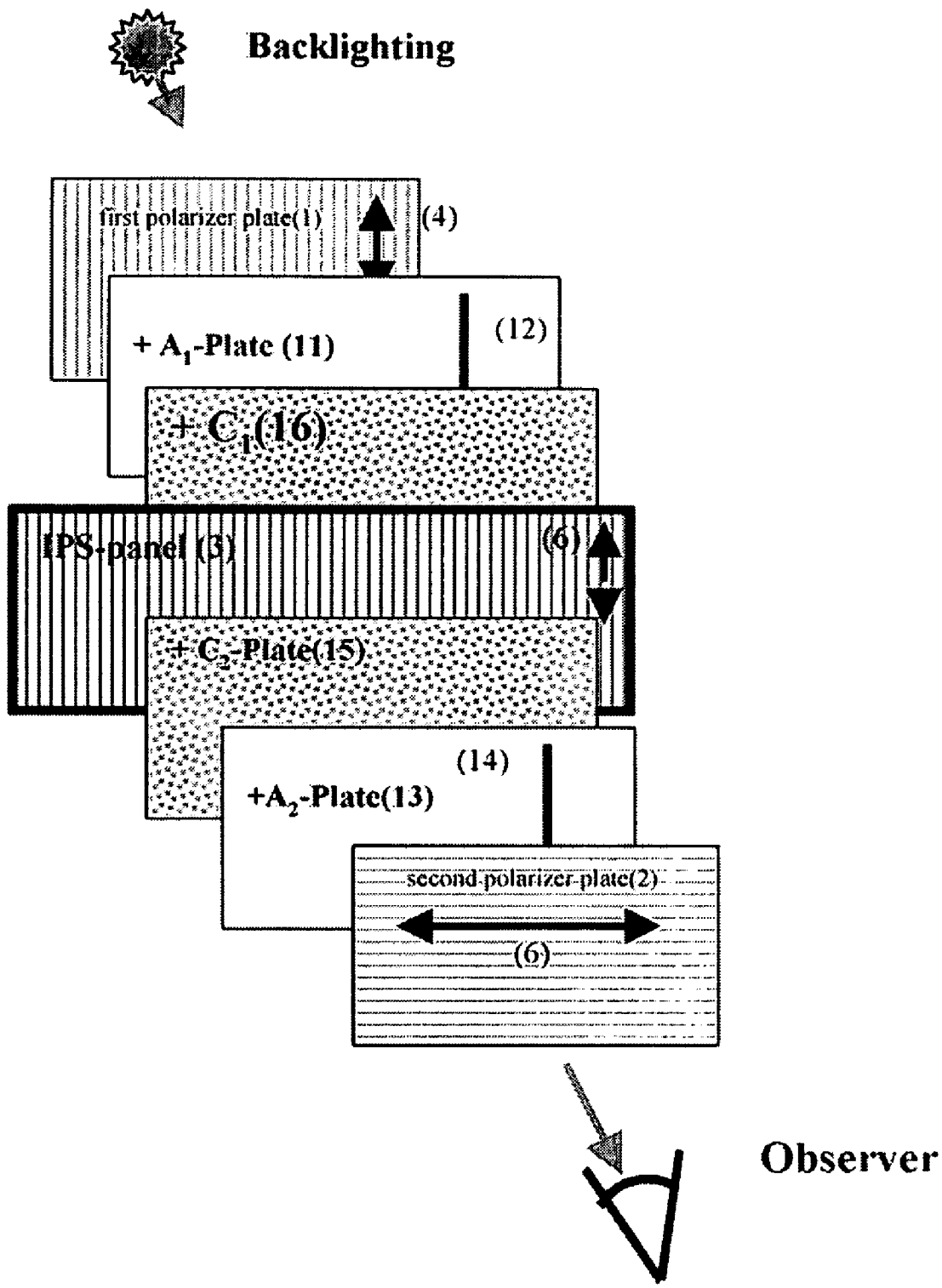
Figure 20:
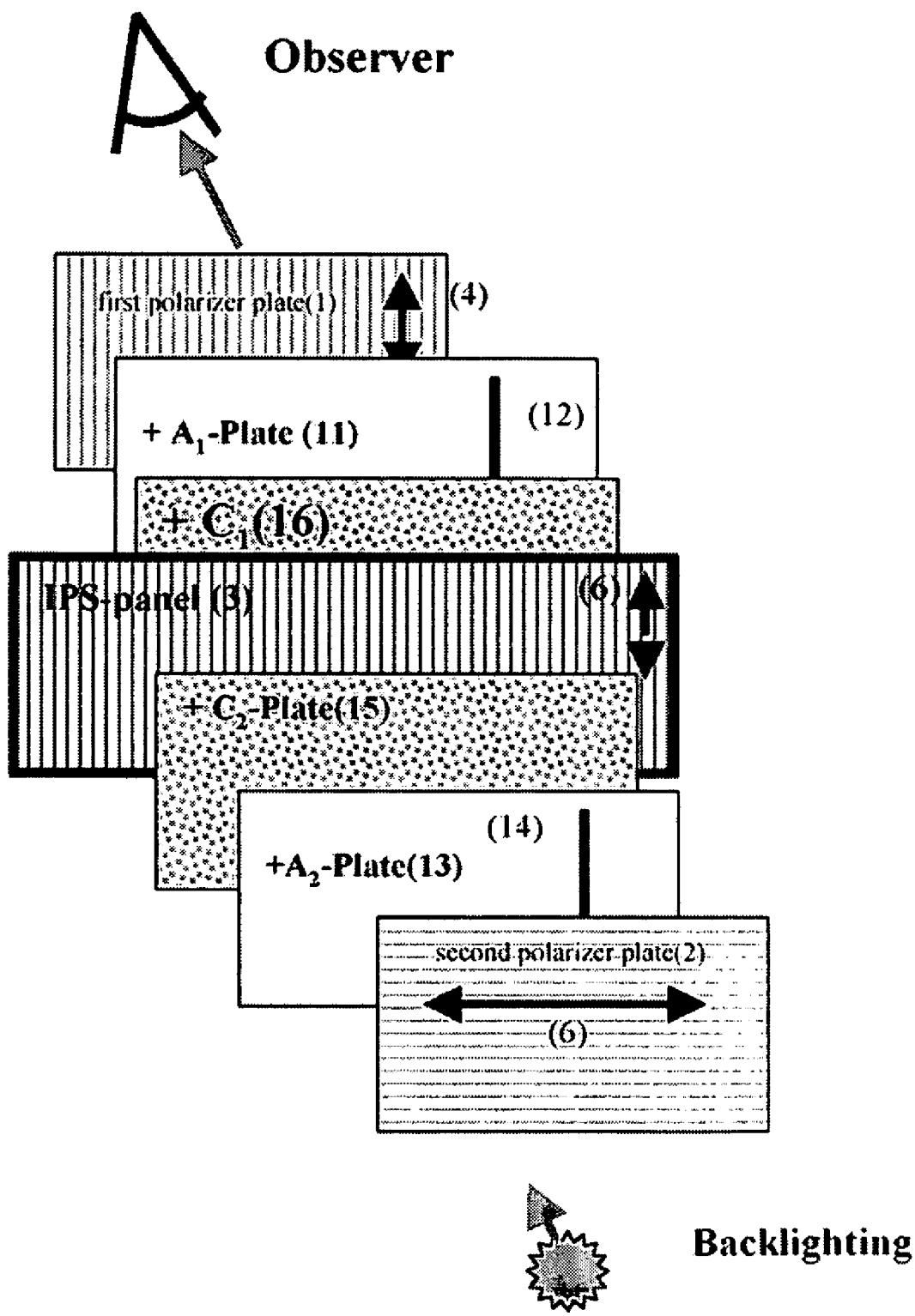

FIG. 19 shows an eleventh IPS-LCD structure including a compensation film according to the sixth embodiment of the present invention and FIG. 20 shows a twelfth IPS-LCD structure including a compensation film according to the sixth embodiment of the present invention. The eleventh and twelfth IPS-LCD structures shown in FIGS. 19 and 20 are

TABLE 6

| Internal protective film of 1st polarizer plate | +C-plate | A-plate | IPS-LCD | A-plate | +C-plate | Internal protective film of 2nd polarizer plate | Minimum contrast ratio value at inclination angle of 70° |
|---|---|---|---|---|---|---|---|
| 80 μm TAC | 70 | 270 | 310 nm | 160 | 150 | 80 μm TAC | 45:1 |
| 40 μm TAC | 40 | 280 | | 160 | 150 | | 46:1 |
| Isotropic COP | 0 | 280 | | 160 | 150 | | 42:1 |
| 80 μm TAC | 40 | 280 | | 120 | 130 | 40 μm TAC | 73:1 |
| 40 μm TAC | 30 | 0 | | 140 | 120 | | 94:1 |
| Isotropic COP | 30 | 0 | | 120 | 140 | | 146:1 |
| 80 μm TAC | 30 | 100 | | 150 | 60 | Isotropic COP | 90:1 |
| 40 μm TAC | 20 | 100 | | 140 | 90 | | 126:1 |
| Isotropic COP | 30 | 0 | | 120 | 110 | | 142:1 |

According to the sixth embodiment of the present invention, there is provided an LCD including a first polarizer plate 1, a first +A-plate 11, a first +C-plate 16, an IPS panel liquid crystal cell 3, a second +C-plate 15, a second +A-plate 13, and a second polarizer plate, which are sequentially aligned and in which an optical axis 12 of the first A-plate is parallel to an absorption axis 4 of the first polarizer plate and an optical axis 14 of the second A-plate is perpendicular to an absorption axis 6 of the second polarizer plate.

substantially identical to each other, except for light sources thereof, which are aligned in opposition to each other. The eleventh and twelfth IPS-LCD structures shown in FIGS. 19 and 20 represent the same viewing angle characteristics.

Figure 29:
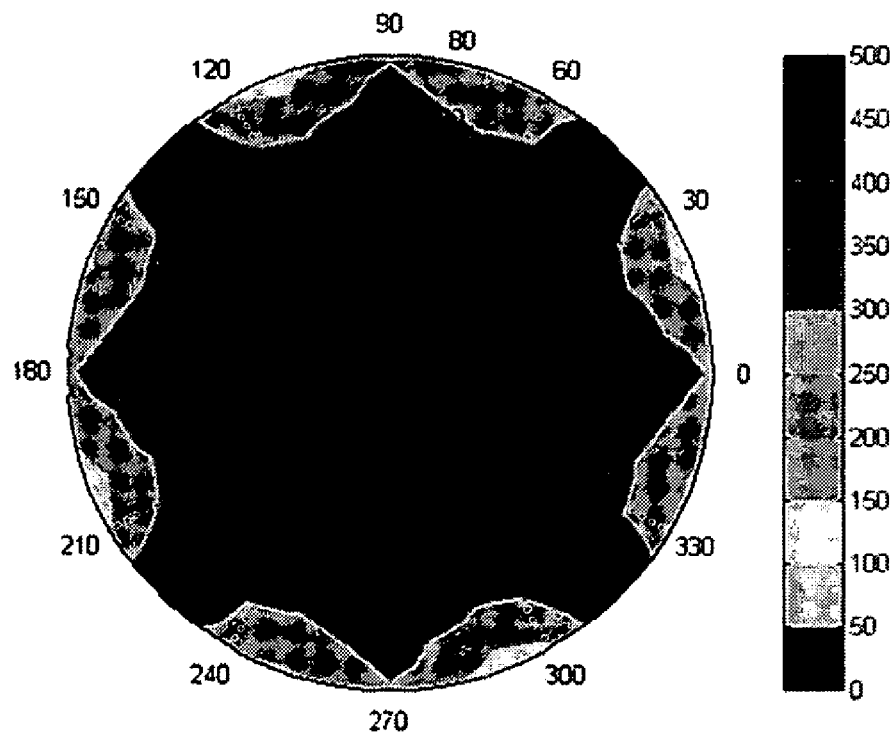

FIG. 29 and Table 7 show a simulation result for the contrast characteristic when practical design values of a retardation film are applied to the IPS-LCD structures shown in FIGS. 19 and 20.

TABLE 7

| Internal protective film of 1st polarizer plate | A-plate | +C-plate | IPS-LCD | +C-plate | A-plate | Internal protective film of 2nd polarizer plate | Minimum contrast ratio value at inclination angle of 70° |
|---|---|---|---|---|---|---|---|
| 80 μm TAC | 110 | 110 | 310 nm | 210 | 40 | 80 μm TAC | 24:1 |
| 40 μm TAC | 110 | 110 | | 210 | 100 | | 75:1 |
| Isotropic COP | 0 | 110 | | 210 | 110 | | 59:1 |
| 80 μm TAC | 30 | 110 | | 150 | 110 | 40 μm TAC | 133:1 |
| 40 μm TAC | 20 | 110 | | 170 | 130 | | 109:1 |
| Isotropic COP | 0 | 110 | | 200 | 130 | | 64:1 |
| 80 μm TAC | 0 | 110 | | 190 | 160 | Isotropic | 62:1 |

TABLE 7-continued

| Internal protective film of 1st polarizer plate | A-plate | +C-plate | IPS-LCD | +C-plate | A-plate | Internal protective film of 2nd polarizer plate | Minimum contrast ratio value at inclination angle of 70° |
|---|---|---|---|---|---|---|---|
| 40 μm TAC | 180 | 120 | | 240 | 130 | COP | 30:1 |
| Isotropic COP | 180 | 120 | | 200 | 160 | | 48:1 |

According to the seventh embodiment of the present invention, there is provided an LCD including a first polarizer plate 1, a first +C-plate 16, a first +A-plate 11, an IPS panel liquid crystal cell 3, a second +C-plate 15, a second +A-plate 13, and a second polarizer plate, which are sequentially aligned and in which an optical axis 12 of the first A-plate is parallel to an absorption axis 4 of the first polarizer plate and an optical axis 14 of the second A-plate is perpendicular to an absorption axis 6 of the second polarizer plate.

In this case, the first +C-plate 16 preferably has a retardation value in a range of 1 nm to 500 nm at a wavelength of 550 nm and the second +C-plate 15 preferably has a retardation value in a range of 1 nm to 500 nm at a wavelength of 550 nm.

In addition, the first A-plate 11 preferably has a retardation value in a range of 1 nm to 500 nm at a wavelength of 550 nm and the second A-plate 13 preferably has a retardation value in a range of 1 nm to 500 nm at a wavelength of 550 nm.

Figure 21:
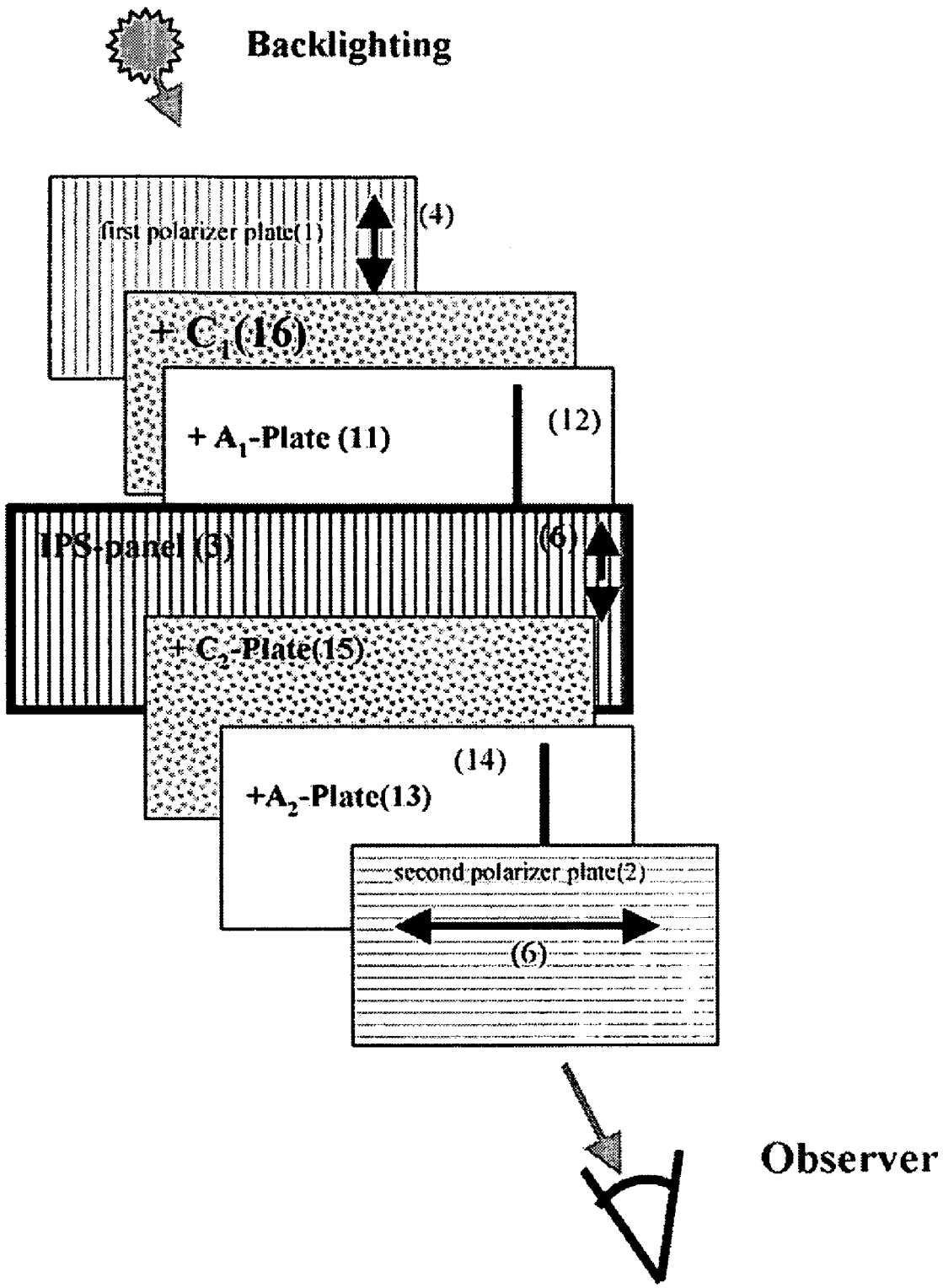
Figure 22:
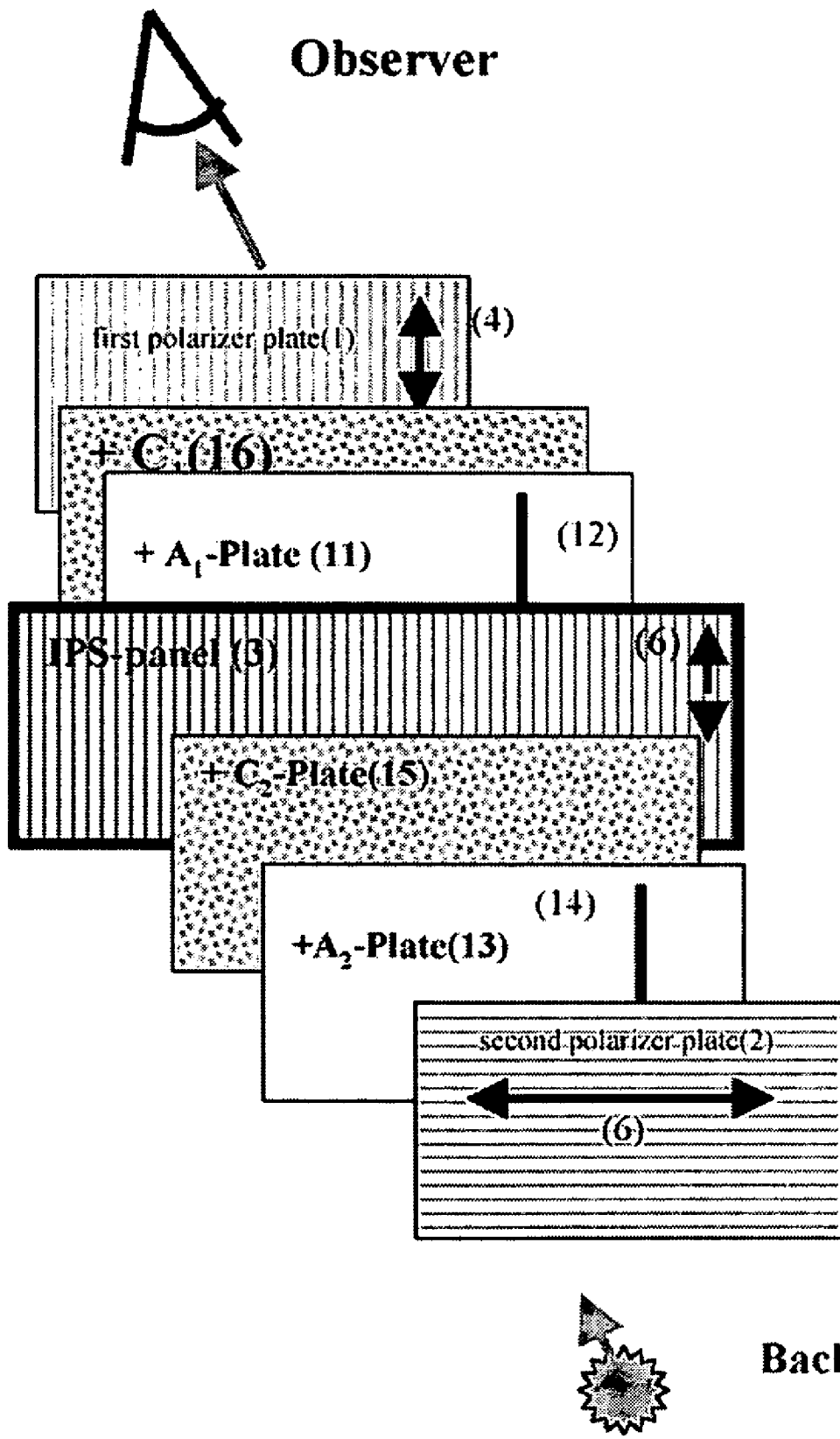

FIG. 21 shows a thirteenth IPS-LCD structure including a compensation film according to the seventh embodiment of the present invention and FIG. 22 shows a fourteenth IPS-LCD structure including a compensation film according to the seventh embodiment of the present invention. The thirteenth and fourteenth IPS-LCD structures shown in FIGS. 21 and 22 are substantially identical to each other, except for light sources thereof, which are aligned in opposition to each other. The thirteenth and fourteenth IPS-LCD structures shown in FIGS. 21 and 22 represent the same viewing angle characteristics.

Figure 30:
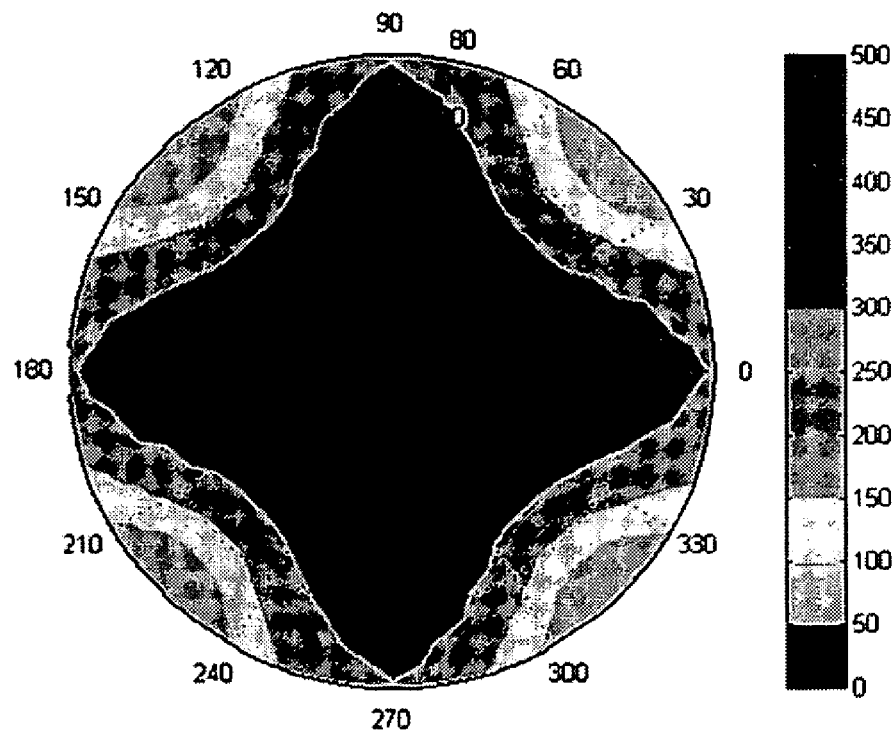

FIG. 30 and Table 8 show a simulation result for the contrast characteristic when practical design values of a retardation film are applied to the IPS-LCD structures shown in FIGS. 21 and 22.

According to the eighth embodiment of the present invention, there is provided an LCD including a first polarizer plate 1, a first +A-plate 11, a first +C-plate 16, an IPS panel liquid crystal cell 3, a second +A-plate 13, a second +C-plate 15, and a second polarizer plate, which are sequentially aligned and in which an optical axis 12 of the first A-plate is parallel to an absorption axis 4 of the first polarizer plate and an optical axis 14 of the second A-plate is parallel to an absorption axis 6 of the second polarizer plate.

In this case, the first +C-plate 16 preferably has a retardation value in a range of 1 nm to 500 nm at a wavelength of 550 nm and the second +C-plate 15 preferably has a retardation value in a range of 1 nm to 500 nm at a wavelength of 550 nm.

In addition, the first A-plate 11 preferably has a retardation value in a range of 1 nm to 500 nm at a wavelength of 550 nm and the second A-plate 13 preferably has a retardation value in a range of 1 nm to 500 nm at a wavelength of 550 nm.

Figure 23:
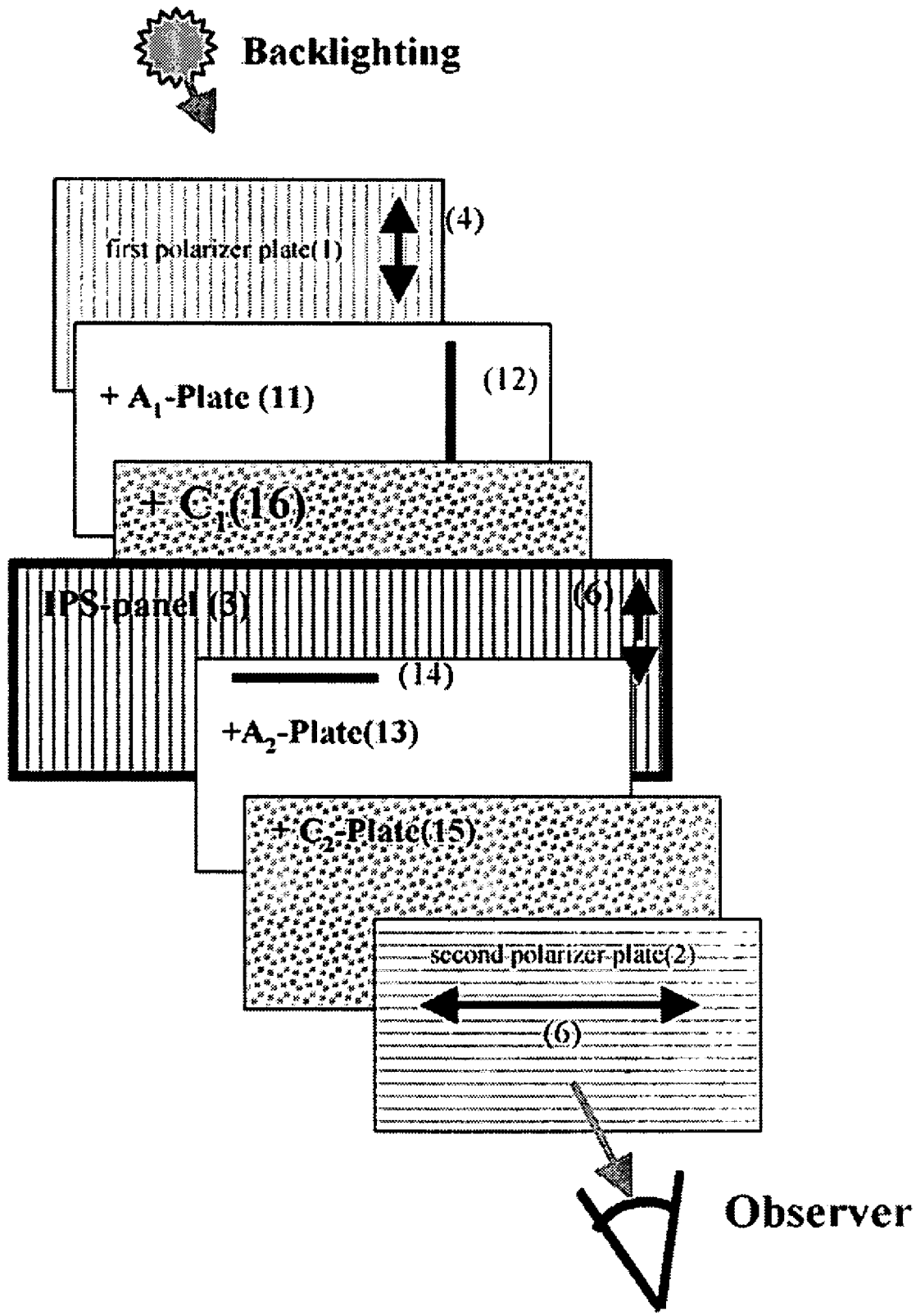
Figure 24:
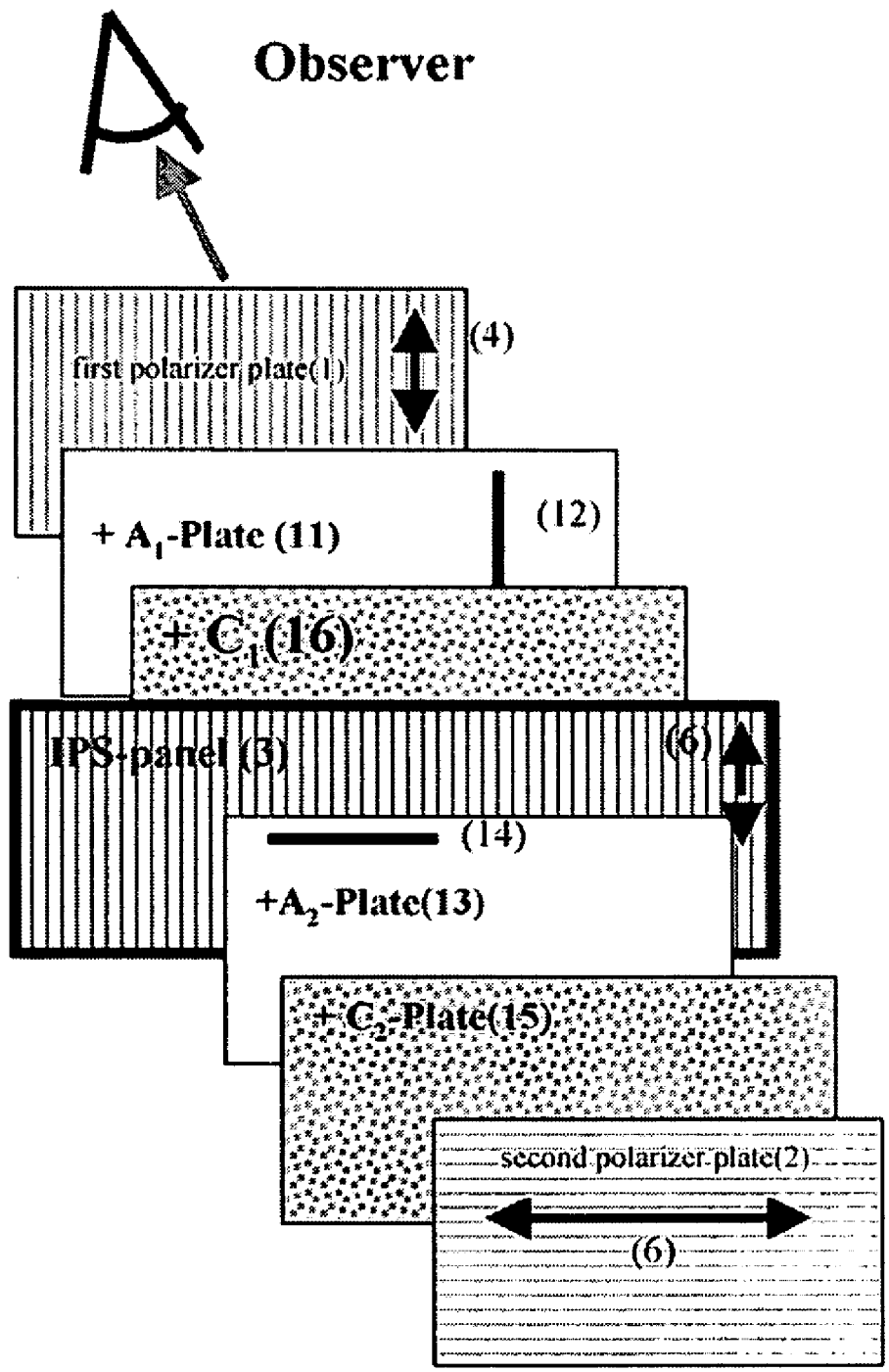

FIG. 23 shows a fifteenth IPS-LCD structure including a compensation film according to the eighth embodiment of the present invention and FIG. 24 shows a sixteenth IPS-LCD structure including a compensation film according to the eighth embodiment of the present invention. The fifteenth and sixteenth IPS-LCD structures shown in FIGS. 23 and 24 are substantially identical to each other, except for light sources thereof, which are aligned in opposition to each other. The fifteenth and sixteenth IPS-LCD structures shown in FIGS. 23 and 24 represent the same viewing angle characteristics.

Figure 31:
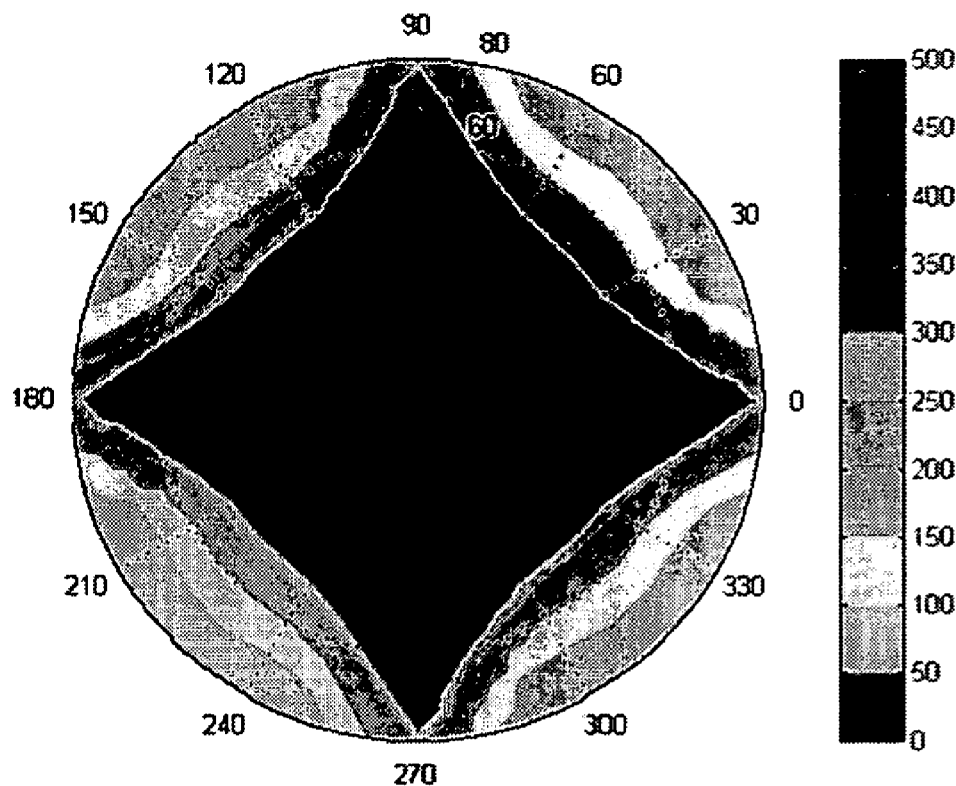

FIG. 31 and Table 9 show a simulation result for the contrast characteristic when practical design values of a retardation film are applied to the IPS-LCD structures shown in FIGS. 23 and 24.

TABLE 8

| Internal protective film of 1st polarizer plate | C-plate | A-plate | IPS-LCD | +C-plate | A-plate | Internal protective film of 2nd polarizer plate | Minimum contrast ratio value at inclination angle of 70° |
|---|---|---|---|---|---|---|---|
| 80 μm TAC | 100 | 200 | 310 nm | 70 | 100 | 80 μm TAC | 40:1 |
| 40 μm TAC | 60 | 230 | | 60 | 100 | | 25:1 |
| | 0 | 90 | | 110 | 80 | | 99:1 |
| 80 μm TAC | 50 | 70 | | 80 | 90 | 40 μm TAC | 63:1 |
| 40 μm TAC | 20 | 70 | | 90 | 100 | | 94:1 |
| | 10 | 90 | | 100 | 120 | | 117:1 |
| 80 μm TAC | 50 | 40 | | 80 | 120 | Isotropic COP | 95:1 |
| 40 μm TAC | 50 | 60 | | 100 | 150 | | 133:1 |
| | 50 | 40 | | 110 | 180 | | 69:1 |

TABLE 9

| Internal protective film of 1st polarizer plate | A-plate | +C-plate | IPS-LCD | A-plate | +C-plate | Internal protective film of 2nd polarizer plate | Minimum contrast ratio value at inclination angle of 70° |
|---|---|---|---|---|---|---|---|
| 80 μm TAC | 60 | 60 | 310 nm | 100 | 120 | 80 μm TAC | 86:1 |
| 40 μm TAC | 60 | 60 | | 100 | 160 | | 156:1 |
| Isotropic COP | 0 | 60 | | 100 | 190 | | 92:1 |
| 80 μm TAC | 110 | 70 | | 50 | 120 | 40 μm TAC | 46:1 |
| 40 μm TAC | 80 | 70 | | 90 | 140 | | 135:1 |
| Isotropic COP | 0 | 70 | | 100 | 160 | | 84:1 |
| 80 μm TAC | 60 | 80 | | 90 | 80 | Isotropic COP | 171:1 |
| 40 μm TAC | 70 | 80 | | 90 | 100 | | 121:1 |
| Isotropic COP | 0 | 70 | | 100 | 130 | | 94:1 |

According to the ninth embodiment of the present invention, there is provided an LCD including a first polarizer plate 1, a first +A-plate 11, a first +C-plate 16, an IPS panel liquid crystal cell 3, a second +A-plate 13, a second +C-plate 15, and a second polarizer plate, which are sequentially aligned and in which an optical axis 12 of the first A-plate is perpendicular to an absorption axis 4 of the first polarizer plate and an optical axis 14 of the second A-plate is parallel to an absorption axis 6 of the second polarizer plate.

In this case, the first +C-plate 16 preferably has a retardation value in a range of 1 nm to 500 nm at a wavelength of 550 nm and the second +C-plate 15 preferably has a retardation value in a range of 1 nm to 500 nm at a wavelength of 550 nm.

In addition, the first A-plate 11 preferably has a retardation value in a range of 1 nm to 400 nm at a wavelength of 550 nm and the second A-plate 13 preferably has a retardation value in a range of 1 nm to 500 nm at a wavelength of 550 nm.

Figure 25:
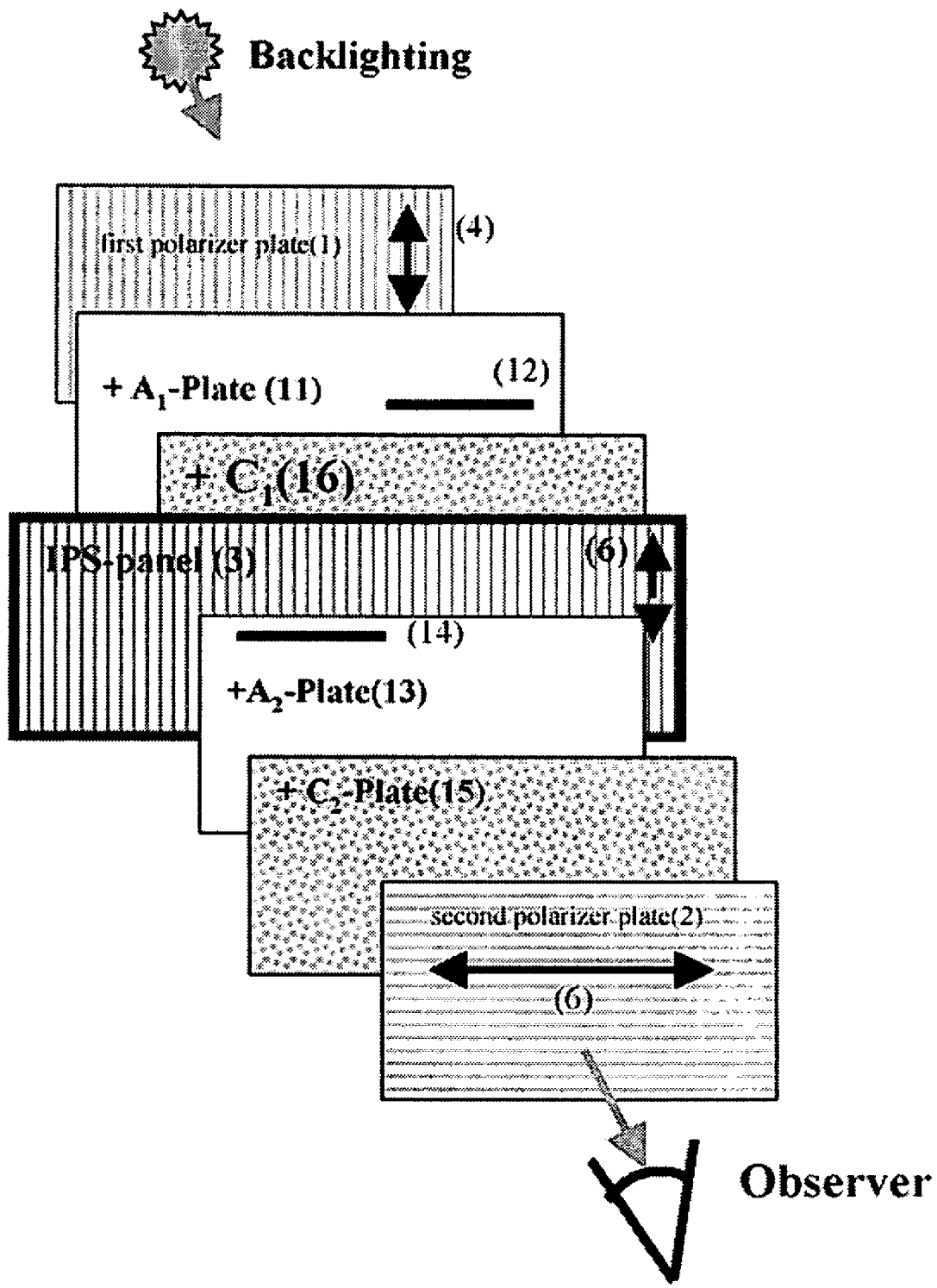
Figure 26:
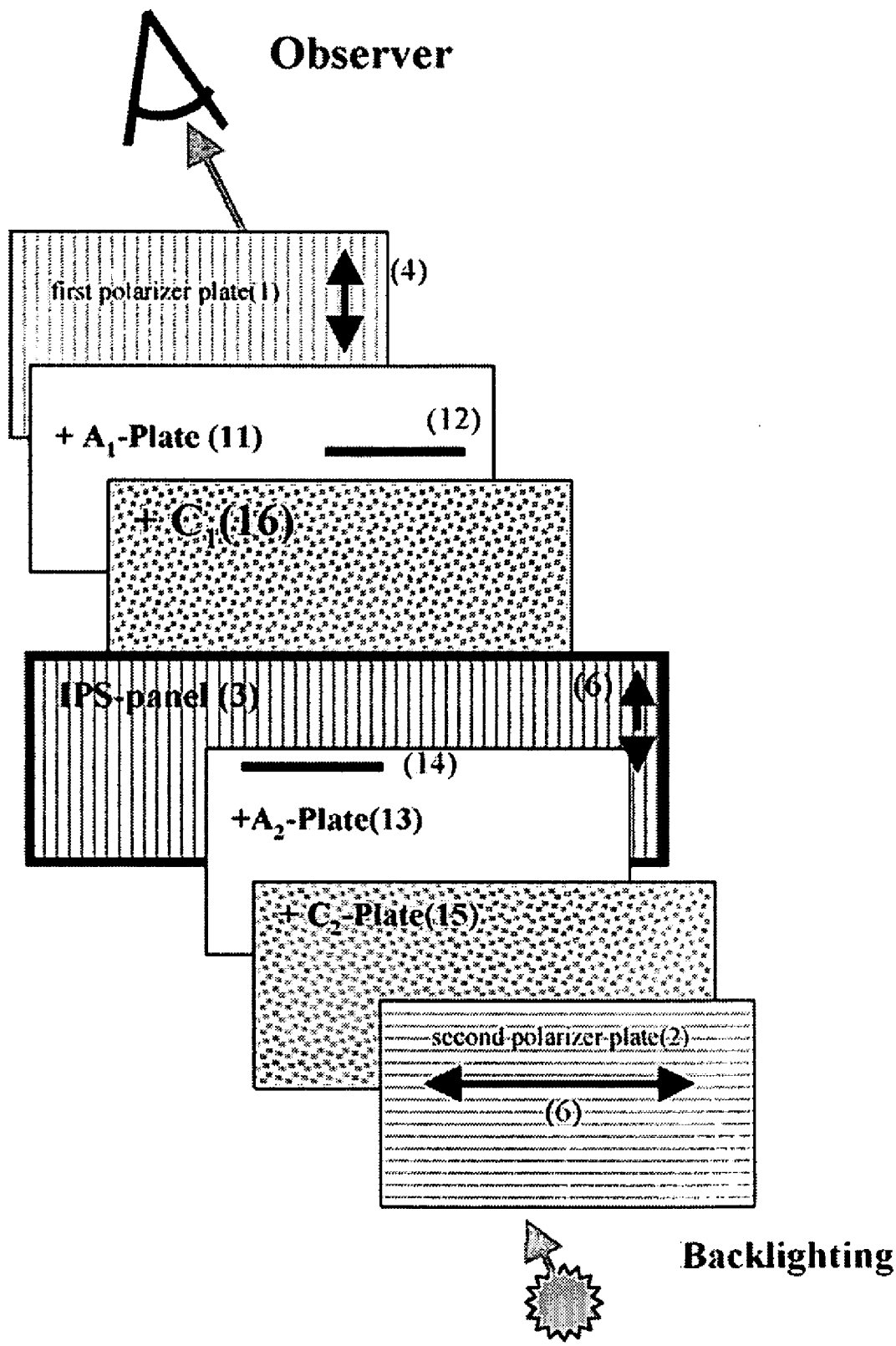

FIG. 25 shows a seventeenth IPS-LCD structure including a compensation film according to the ninth embodiment of the present invention and FIG. 26 shows a eighteenth IPS-LCD structure including a compensation film according to the ninth embodiment of the present invention. The seventeenth and eighteenth IPS-LCD structures shown in FIGS. 25 and 26 are substantially identical to each other, except for light sources thereof, which are aligned in opposition to each other. The seventeenth and eighteenth IPS-LCD structures shown in FIGS. 25 and 26 represent the same viewing angle characteristics.

Figure 32:
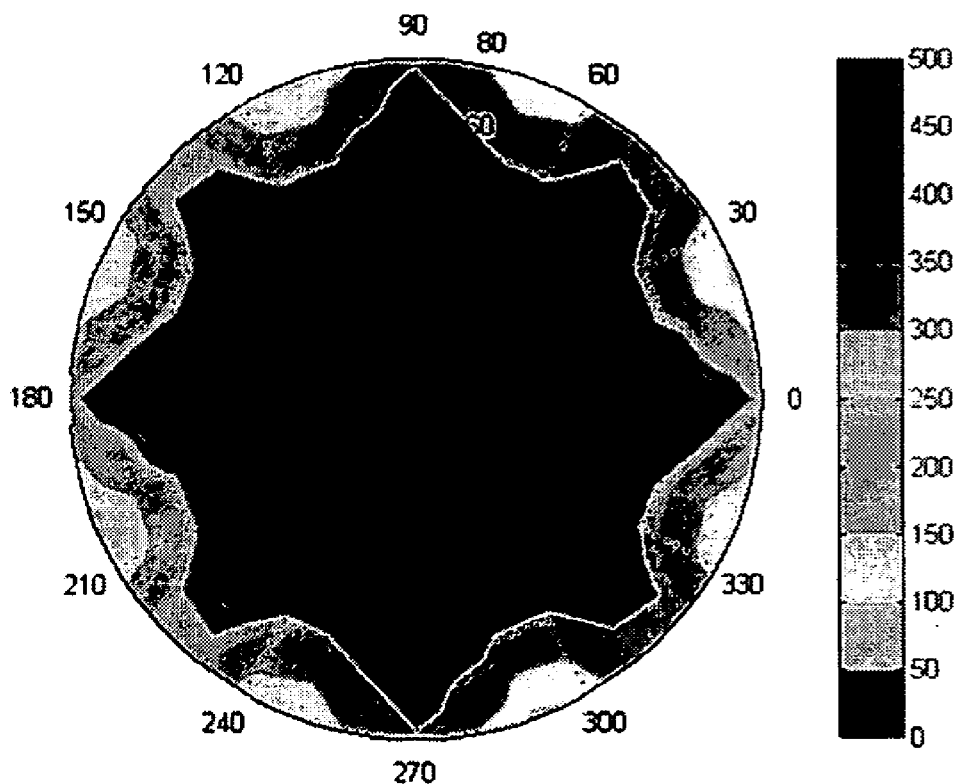

FIG. 32 and Table 10 show a simulation result for the contrast characteristic when practical design values of a retardation film are applied to the IPS-LCD structures shown in FIGS. 25 and 26.

TABLE 10

| Internal protective film of 1st polarizer plate | A-plate | +C-plate | IPS-LCD | A-plate | +C-plate | Internal protective film of 2nd polarizer plate | Minimum contrast ratio value at inclination angle of 70° |
|---|---|---|---|---|---|---|---|
| 80 μm TAC | 20 | 100 | 310 nm | 160 | 150 | 80 μm TAC | 23:1 |
| 40 μm TAC | 10 | 90 | | 110 | 170 | | 79:1 |
| Isotropic COP | 10 | 100 | | 100 | 220 | | 61:1 |
| 80 μm TAC | 250 | 100 | | 140 | 350 | 40 μm TAC | 87:1 |
| 40 μm TAC | 250 | 100 | | 150 | 350 | | 107:1 |
| Isotropic COP | 250 | 90 | | 150 | 320 | | 113:1 |
| 80 μm TAC | 260 | 100 | | 140 | 340 | Isotropic COP | 121:1 |
| 40 μm TAC | 260 | 100 | | 140 | 320 | | 120:1 |
| Isotropic COP | 260 | 90 | | 150 | 300 | | 112:1 |

A diagonal direction represents a direction forming an angle of 45° with regard to the absorption axis of the polarizer plate, causing the worst viewing angle characteristic of the IPS-LCD. When two type retardation films are used as viewing angle compensation films of the IPS-LCD, the viewing angle characteristic in the diagonal direction may be improved (see contrast characteristics illustrated in FIGS. 10 to 14 and 27 to 32).

Protective films used for protecting the polarizer plates may exert an influence upon the viewing angle compensation characteristic of the IPS-LCD. In general, the polarizer plate is made from stretched PVA (polyvinyl alcohol) doped with iodine, and the protective film used for the polarizer plate can be made from a TAC (triacetate cellulose) film having a thickness retardation value, PNB (polynobonene) or a non-oriented COP (cyclo olefin without stretching) film having no thickness retardation value. If the protective film having the thickness retardation value, such as the TAC film, is used for the polarizer plate, the viewing angle compensation characteristic may be deteriorated. However, if an isotropic film, such as the non-oriented COP film (COP without stretching), is used as the protective film for the polarizer plate, a superior viewing angle characteristic can be obtained.

Preferably, the internal protective film for the first and second polarizer plates is one selected from the group consisting of non-stretched COP (cyclo olefin), 40 μm TAC (triacetate cellulose), 80 μm TAC (triacetate cellulose), and PNB (polynobonene). Particularly, the internal protective film for the first polarizer plate 1 is preferably made from COP having a thickness retardation value of 0 or 40 μm TAC.

If the internal protective film made from COP is used for the first polarizer plate, that is, when the internal protective film has the thickness retardation value of 0, the best contrast characteristic can be obtained. Contrast characteristics of the IPS-LCD at the inclination angle of 70° represented when the COP film or the TAC film is used as the internal protective film for the first polarizer plate are illustrated in Tables 1 to 10. As illustrated in Tables 1 to 10, the IPS-LCD represents the best contrast characteristic when the COP film or the 40 μm TAC film is used as the internal protective film for the polarizer plate.

The retardation film used for the A-plate 12 includes a uniaxially stretched polycarbonate film, a uniaxially stretched COP, a nematic liquid crystal film or a discotic liquid crystal film. In addition, a film used for the C-plate 11 includes a homeotropically aligned liquid crystal film or a biaxially stretched polycarbonate film. The +C plate can be fabricated by using a polymer film or a UV curable liquid crystal film.

Meanwhile, the polarizer plate includes an external protective film, PVA-I (stretched PVA doped with iodine), and an internal protective film. Although the TAC film is mainly used as the internal protective film for the polarizer plate, a +A-plate film or a +C-plate film can be used instead of the internal protective film.

Advanced Effect

As described above, the in-plane switching liquid crystal display according to the present invention can improve the contrast characteristic at a front and at a predetermined inclination angle thereof by using the +A-plate and the +C-plate while minimizing a color shift according to viewing angles in the black state.

Embodiments

Hereinafter, preferred embodiments of the present invention will be described. However, it is noted that the preferred embodiments described below are used for illustrative purpose and the present invention is not limited thereto.

Embodiment 1

The IPS-LCD shown in FIG. 4 includes an IPS liquid crystal cell filled with liquid crystal having a cell gap of 2.9 μm, a pretilt angle of 3°, dielectric anisotropy of $\Delta \in =+7$, and a birefringence of $\Delta n=0.1$. The +C-plate 11 is fabricated by using an UV curable and homeotropically aligned liquid crystal film and has a thickness retardation value $R_{th}=174$ nm at a wavelength of 550 nm. The A-plate 12 is fabricated by using a stretched polycarbonate film and has an in-plane retardation value $R_{in}=53$ nm. The internal protective film for the first polarizer plate 1 is made from an isotropic COP film, and the internal protective film for the second polarizer plate 2 is made from a PNB (polynobonene) film having a thickness retardation value $R_{th}=-130$ nm. When a white light is used, the contrast characteristic of the IPS-LCD at an inclination angle of 0° to 80° in all azimuthal angles is illustrated in FIG. 10.

Referring to FIG. 10, a center of a circle corresponds to an inclination angle of 0, and the inclination angle increases as a radius of the circle becomes enlarged. Numerals 20, 40, 60 and 80 marked along the radius of the circle in FIG. 10 represent the inclination angles.

In addition, numerals 0 to 330 marked along a circumference of the circle represent the azimuthal angles. FIG. 10 shows the contrast characteristic in all viewing directions (inclination angles of 0° to 80° and azimuthal angles of 0° to 360°) when an upper polarizer plate is aligned in a direction of an azimuthal angle of 0°, and a lower polarizer plate is aligned in a direction of an azimuthal angle of 90°. An IPS-LCD, which exclusively uses a polarizer plate, may represent a contrast ratio equal to or less than 10:1 at an inclination angle of 80°. However, the IPS-LCD of the present invention represents a contrast ratio above 100:1 at an inclination angle of 80° as shown in FIG. 10.

Embodiment 2

The IPS-LCD shown in FIG. 5 includes an IPS liquid crystal cell filled with liquid crystal having a cell gap of 2.9 μm, a pretilt angle of 3°, dielectric anisotropy of $\Delta \in =+7$, and a birefringence of $\Delta n=0.1$. The +C-plate 11 is fabricated by using an UV curable and homeotropically aligned liquid crystal film and has a thickness retardation value $R_{th}=70$ nm at a wavelength of 550 nm. The A-plate 12 is fabricated by using a stretched polycarbonate film and has an in-plane retardation value $R_{in}=110$. The internal protective film for the first and second polarizer plates 1 and 2 is made from a 40 μm TAC film having a thickness retardation value $R_{th}=-32$ nm.

When a white light is used, the contrast characteristic of the IPS-LCD at an inclination angle of 0° to 80° in all azimuthal angles is illustrated in FIG. 11. Referring to FIG. 11, the IPS-LCD represents the superior contrast characteristic above 50:1 at an inclination angle of 80°.

Embodiment 3

The IPS-LCD shown in FIG. 6 includes an IPS liquid crystal cell filled with liquid crystal having a cell gap of 2.9 μm, a pretilt angle of 3°, dielectric anisotropy of $\Delta \in =+7$, and a birefringence of $\Delta n=0.1$. The +C-plate 11 is fabricated by using an UV curable and homeotropically aligned liquid crystal film and has a thickness retardation value $R_{th}=91$ nm at a wavelength of 550 nm. The A-plate 12 is fabricated by using a stretched polycarbonate film and has an in-plane retardation value $R_{in}=148$. The internal protective film for the first and second polarizer plates 1 and 2 is made from an isotropic COP film. When a white light is used, the contrast characteristic of the IPS-LCD at an inclination angle of 0° to 80° in all azimuthal angles is illustrated in FIG. 12. Referring to FIG. 12, the IPS-LCD represents the superior contrast characteristic above 200:1 at an inclination angle of 80°.

Embodiment 4

The IPS-LCD shown in FIG. 7 includes an IPS liquid crystal cell filled with liquid crystal having a cell gap of 2.9 μm, a pretilt angle of 3°, dielectric anisotropy of $\Delta \in =+7$, and a birefringence of $\Delta n=0.1$. The first +C-plate 11 is fabricated by using an UV curable and homeotropically aligned liquid crystal film and has a thickness retardation value $R_{th}=175$ nm at a wavelength of 550 nm. The A-plate 12 is fabricated by using a stretched polycarbonate film and has an in-plane retardation value $R_{in}=170$. The internal protective film for the first polarizer plate 1 is made from 40 μm TAC having a thickness retardation value $R_{th}=-32$ nm and the internal protective film for the second polarizer plate 2 is made from 80 μm TAC having a thickness retardation value $R_{th}=-64$ nm. When a white light is used, the contrast characteristic of the IPS-LCD at an inclination angle of 0° to 80° in all azimuthal angles is illustrated in FIG. 13. Referring to FIG. 13, the IPS-LCD represents the superior contrast characteristic above 50:1 at an inclination angle of 80°.

Embodiment 5

The IPS-LCD shown in FIGS. 8 and 9 includes an IPS liquid crystal cell filled with liquid crystal having a cell gap of 2.9 μm, a pretilt angle of 3°, dielectric anisotropy of $\Delta\in=+7$, and a birefringence of $\Delta n=0.1$. The first +C-plate 11 is fabricated by using an UV curable and homeotropically aligned liquid crystal film and has an in-plane retardation value $R_{in}=100$ nm. The second +C-plate 14 is fabricated by using an UV curable and homeotropically aligned liquid crystal film and has a thickness retardation value $R_{th}=173$ nm at a wavelength of 550 nm. The A-plate 12 is fabricated by using a stretched COP film and has an in-plane retardation value $R_{in}=125$ nm. The internal protective film for the first and second polarizer plates is made from 80 μm TAC having a thickness retardation value $R_{th}=-64$ nm. When a white light is used, the contrast characteristic of the IPS-LCD at an inclination angle of 0° to 80° in all azimuthal angles is illustrated in FIG. 14. Referring to FIG. 14, the IPS-LCD represents the superior contrast characteristic above 200:1 at an inclination angle of 80°.

Embodiment 6

The IPS-LCD shown in FIGS. 15 and 16 includes an IPS liquid crystal cell filled with liquid crystal having a cell gap of 3.1 μm, a pretilt angle of 1°, dielectric anisotropy of $\Delta\in=+7$, and a birefringence of $\Delta n=0.1$. The +C-plate 15 is fabricated by using an UV curable and homeotropically aligned liquid crystal film and has a thickness retardation value $R_{th}=60$ nm at a wavelength of 550 nm. The second A-plate 13 is fabricated by using a stretched COP film and has an in-plane retardation value $R_{in}=160$ nm. The first A-plate 11 is fabricated by using a stretched COP film and has an in-plane retardation value $R_{in}=80$ nm. The internal protective film for the first polarizer plate 1 is made from a 40 μm TAC film having a thickness retardation value $R_{th}=-30$ nm and the internal protective film for the second polarizer plate 2 is made from a non-stretched isotropic COP film, which rarely represents thickness retardation. When a white light is used, the contrast characteristic of the IPS-LCD at an inclination angle of 0° to 80° in all azimuthal angles is illustrated in FIG. 27.

Embodiment 7

The IPS-LCD shown in FIGS. 17 and 18 includes an IPS liquid crystal cell filled with liquid crystal having a cell gap of 3.1 μm, a pretilt angle of 1°, dielectric anisotropy of $\Delta\in=+7$, and a birefringence of $\Delta n=0.1$. The first A-plate 11 is fabricated by using a stretched COP film and has an in-plane retardation value $R_{in}=100$ nm. The first +C-plate 16 is fabricated by using an UV curable and homeotropically aligned liquid crystal film and has a thickness retardation value $R_{th}=20$ nm at a wavelength of 550 nm. The second A-plate 13 is fabricated by using a stretched COP film and has an in-plane retardation value $R_{in}=140$ nm. The second +C-plate 15 is fabricated by using an UV curable and homeotropically aligned liquid crystal film and has a thickness retardation value $R_{th}=90$ nm at a wavelength of 550 nm. The internal protective film for the first polarizer plate 1 is made from a 40 μm TAC film having a thickness retardation value $R_{th}=-30$ nm and the internal protective film for the second polarizer plate 2 is made from a non-stretched isotropic COP film, which rarely represents thickness retardation. When a white light is used, the contrast characteristic of the IPS-LCD at an inclination angle of 0° to 80° in all azimuthal angles is illustrated in FIG. 28.

Embodiment 8

The IPS-LCD shown in FIGS. 19 and 20 includes an IPS liquid crystal cell filled with liquid crystal having a cell gap of 3.1 μm, a pretilt angle of 1°, dielectric anisotropy of $\Delta\in=+7$, and a birefringence of $\Delta n=0.1$. The first A-plate 11 is fabricated by using a stretched COP film and has an in-plane retardation value $R_{in}=20$ nm. The first +C-plate 16 is fabricated by using an UV curable and homeotropically aligned liquid crystal film and has a thickness retardation value $R_{th}=110$ nm at a wavelength of 550 nm. The second A-plate 13 is fabricated by using a stretched COP film and has an in-plane retardation value $R_{in}=130$ nm. The second +C-plate 15 is fabricated by using an UV curable and homeotropically aligned liquid crystal film and has a thickness retardation value $R_{th}=170$ nm at a wavelength of 550 nm. The internal protective film for the first and second polarizer plates 1 and 2 is made from a 40 μm TAC film having a thickness retardation value $R_{th}=-30$ nm. When a white light is used, the contrast characteristic of the IPS-LCD at an inclination angle of 0° to 80° in all azimuthal angles is illustrated in FIG. 29.

Embodiment 9

The IPS-LCD shown in FIGS. 21 and 22 includes an IPS liquid crystal cell filled with liquid crystal having a cell gap of 3.1 μm, a pretilt angle of 1°, dielectric anisotropy of $\Delta\in=+7$, and a birefringence of $\Delta n=0.1$. The first A-plate 11 is fabricated by using a stretched COP film and has an in-plane retardation value $R_{in}=70$ nm. The first +C-plate 16 is fabricated by using an UV curable and homeotropically aligned liquid crystal film and has a thickness retardation value $R_{th}=50$ nm at a wavelength of 550 nm. The second A-plate 13 is fabricated by using a stretched COP film and has an in-plane retardation value $R_{in}=90$ nm. The second +C-plate 15 is fabricated by using an UV curable and homeotropically aligned liquid crystal film and has a thickness retardation value $R_{th}=8\,0$ nm at a wavelength of 550 nm. The internal protective film for the first polarizer plate 1 is made from a 80 μm TAC film having a thickness retardation value $R_{th}=-50$ nm, and the internal protective film for the second polarizer plate 2 is made from a 40 μm TAC film having a thickness retardation value $R_{th}=-30$ nm. When a white light is used, the contrast characteristic of the IPS-LCD at an inclination angle of 0° to 80° in all azimuthal angles is illustrated in FIG. 30.

Embodiment 10

The IPS-LCD shown in FIGS. 23 and 24 includes an IPS liquid crystal cell filled with liquid crystal having a cell gap of 3.1 μm, a pretilt angle of 1°, dielectric anisotropy of $\Delta\in=+7$, and a birefringence of $\Delta n=0.1$. The first A-plate 11 is fabricated by using a stretched COP film and has an in-plane retardation value $R_{in}=60$ nm. The first +C-plate 16 is fabricated by using an UV curable and homeotropically aligned liquid crystal film and has a thickness retardation value $R_{th}=60$ nm at a wavelength of 550 nm. The second A-plate 13 is fabricated by using a stretched COP film and has an in-plane retardation value $R_{in}=100$ nm. The second +C-plate 15 is fabricated by using an UV curable and homeotropically aligned liquid crystal film and has a thickness retardation value $R_{th}=120$ nm at a wavelength of 550 nm. The internal protective film for the first and second polarizer plates 1 and 2 is made from a 80 μm TAC film having a thickness retardation value $R_{th}=-50$ nm. When a white light is used, the contrast characteristic of the IPS- LCD at an inclination angle of 0° to 80° in all azimuthal angles is illustrated in FIG. 31.

Embodiment 11

The IPS-LCD shown in FIGS. 25 and 26 includes an IPS liquid crystal cell filled with liquid crystal having a cell gap of 3.1 μm, a pretilt angle of 1°, dielectric anisotropy of $\Delta\epsilon=+7$, and a birefringence of $\Delta n=0.1$. The first A-plate 11 is fabricated by using a stretched COP film and has an in-plane retardation value $R_{in}=250$ nm. The first +C-plate 16 is fabricated by using an UV curable and homeotropically aligned liquid crystal film and has a thickness retardation value $R_{th}=100$ nm at a wavelength of 550 nm. The second A-plate 13 is fabricated by using a stretched COP film and has an in-plane retardation value $R_{in}=150$ nm. The second +C-plate 15 is fabricated by using an UV curable and homeotropically aligned liquid crystal film and has a thickness retardation value $R_{th}=350$ nm at a wavelength of 550 nm. The internal protective film for the first and second polarizer plates 1 and 2 is made from a 40 μm TAC film having a thickness retardation value $R_{th}=-30$ nm. When a white light is used, the contrast characteristic of the IPS-LCD at an inclination angle of 0° to 80° in all azimuthal angles is illustrated in FIG. 32.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

The invention claimed is:

1. An in-plane switching liquid crystal display comprising:
   a first polarizer plate;
   a liquid crystal cell, which is horizontally aligned and filled with liquid crystal of positive dielectric anisotropy ($\Delta\epsilon>0$), an optical axis of the liquid crystal filled in the liquid crystal cell being aligned in-plane in parallel to polarizer plate; and
   a second polarizer plate,
   wherein an absorption axis of the first polarizer plate is perpendicular to an absorption axis of the second polarizer plate, and the optical axis of the liquid crystal filled in the liquid crystal cell is parallel to the absorption axis of the first polarizer plate,
   wherein at least one +A-plate ($n_x>n_y=n_z$) and at least one +C-plate ($n_x=n_y<n_z$) are interposed between one of the first and second polarizer plates and the liquid crystal cell in order to compensate for a viewing angle in a dark state, and an optical axis of the +A-plate is adjusted according to an alignment order of +A-plates and +C-plates, in which $n_x$ and $n_y$ represent an in-plane refractive index, $n_z$ represents a thickness refractive index, the A-plate has an in-plane retardation value of $R_{in}=d\times(n_x-n_y)$, and the +C-plate has a thickness retardation value of $R_{in}=d\times(n_z-n_y)$, wherein d is a thickness of a retardation film.

2. The in-plane switching liquid crystal display as claimed in claim 1, wherein a pair of compensation films including the +A-plate and the +C-plate are aligned between the second polarizer plate and the liquid crystal cell,
   in which the optical axis of the +A-plate is aligned perpendicularly to an absorption axis of the second polarizer plate if the +A-plate is adjacent to the second polarizer plate, or the optical axis of the +A-plate is aligned in parallel to the absorption axis of the second polarizer plate if the +A-plate is adjacent to the liquid crystal cell.

3. The in-plane switching liquid crystal display as claimed in claim 1, wherein the first polarizer plate, the liquid crystal cell, the +C-plate, the +A-plate, and the second polarizer plate are sequentially aligned, in which the optical axis of the +A-plate is perpendicular to an absorption axis of the second polarizer plate.

4. The in-plane switching liquid crystal display as claimed in claim 3, wherein the +A-plate has an in-plane retardation value in a range of 30 nm to 500 nm at a wavelength of 550 nm.

5. The in-plane switching liquid crystal display as claimed in claim 3, wherein the +C-plate has a thickness retardation value in a range of 30 nm to 500 nm at a wavelength of 550 nm.

6. The in-plane switching liquid crystal display as claimed in claim 1, wherein the first polarizer plate, the liquid crystal cell, the +A-plate, the +C-plate, and the second polarizer plate are sequentially aligned, in which the optical axis of the +A-plate is parallel to an absorption axis of the second polarizer plate.

7. The in-plane switching liquid crystal display as claimed in claim 6, wherein the +A-plate has an in-plane retardation value in a range of 50 nm to 200 nm at a wavelength of 550 nm.

8. The in-plane switching liquid crystal display as claimed in claim 6, wherein the +C-plate has a retardation value in a range of 80 nm to 300 nm at a wavelength of 550 nm.

9. The in-plane switching liquid crystal display as claimed in claim 1, wherein the first polarizer plate, a first +C-plate, the liquid crystal cell, the +A-plate, a second +C-plate, and the second polarizer plate are sequentially aligned, in which the optical axis of the +A-plate is parallel to an absorption axis of the second polarizer plate.

10. The in-plane switching liquid crystal display as claimed in claim 9, wherein the +A-plate has an in-plane retardation value in a range of 50 nm to 200 nm at a wavelength of 550 nm.

11. The in-plane switching liquid crystal display as claimed in claim 9, wherein the first +C-plate has a retardation value in a range of 10 nm to 400 nm at a wavelength of 550 nm.

12. The in-plane switching liquid crystal display as claimed in claim 9, wherein the second +C-plate has a retardation value in a range of 90 nm to 400 nm at a wavelength of 550 nm.

13. The in-plane switching liquid crystal display as claimed in claim 1, wherein the first polarizer plate, a first +A-plate, the liquid crystal cell, a second +A-plate, the +C-plate, and the second polarizer plate are sequentially aligned, in which an optical axis of the first +A-plate is parallel to an absorption axis of the first polarizer plate, and an optical axis of the second +A-plate is parallel to an absorption axis of the second polarizer plate.

14. The in-plane switching liquid crystal display as claimed in claim 1, wherein the first polarizer plate, a first +C-plate, a first +A-plate, the liquid crystal cell, a second +A-plate, a second +C-plate, and the second polarizer plate are sequentially aligned, in which an optical axis of the first +A-plate is parallel to an absorption axis of the first polarizer plate, and an optical axis of the second +A-plate is parallel to an absorption axis of the second polarizer plate.

15. The in-plane switching liquid crystal display as claimed in claim 1, wherein the first polarizer plate, a first +A-plate, a first +C-plate, the liquid crystal cell, a second +C-plate, a second +A-plate, and the second polarizer plate are sequentially aligned, in which an optical axis of the first +A-plate is parallel to an absorption axis of the first polarizer plate, and an optical axis of the second +A-plate is perpendicular to an absorption axis of the second polarizer plate.

16. The in-plane switching liquid crystal display as claimed in claim 1, wherein the first polarizer plate, a first +C-plate, a first +A-plate, the liquid crystal cell, a second +C-plate, a second +A-plate, and the second polarizer plate are sequentially aligned, in which an optical axis of the first +A-plate is parallel to an absorption axis of the first polarizer plate, and an optical axis of the second +A-plate is perpendicular to an absorption axis of the second polarizer plate.

17. The in-plane switching liquid crystal display as claimed in claim 1, wherein the first polarizer plate, a first +A-plate, a first +C-plate, the liquid crystal cell, a second +A-plate, a second +C-plate, and the second polarizer plate are sequentially aligned, in which an optical axis of the first +A-plate is parallel to an absorption axis of the first polarizer plate, and an optical axis of the second +A-plate is parallel to an absorption axis of the second polarizer plate.

18. The in-plane switching liquid crystal display as claimed in claim 1, wherein the first polarizer plate, a first +A-plate, a first +C-plate, the liquid crystal cell, a second +A-plate, a second +C-plate, and the second polarizer plate are sequentially aligned, in which an optical axis of the first +A-plate is perpendicular to an absorption axis of the first polarizer plate, and an optical axis of the second +A-plate is parallel to an absorption axis of the second polarizer plate.

19. The in-plane switching liquid crystal display as claimed in claim 13, wherein the +C-plate has a retardation value in a range of 50 nm to 400 nm at a wavelength of 550 nm.

20. The in-plane switching liquid crystal display as claimed in claim 13, wherein the first and second +A-plates have a retardation value in a range of 1 nm to 500 nm at a wavelength of 550 nm, respectively.

21. The in-plane switching liquid crystal display as claimed in claim 14, wherein the first and second +C-plates have a retardation value in a range of 1 nm, to 500 mn at a wavelength of 550 nm, respectively.

22. The in-plane switching liquid crystal display as claimed in claim 1, wherein at least one of internal protective films for the first and second polarizer plates has a retardation value of 0 of a negative thickness retardation value.

23. The in-plane switching liquid crystal display as claimed in claim 1, wherein the +A-plate is used as an internal protective film for at least one polarizer plate.

24. The in-plane switching liquid crystal display as claimed in claim 1, wherein the +C-plate is used as an internal protective film for at least one polarizer plate.

25. The in-plane switching liquid crystal as claimed in claim 14, wherein the first and second +A-plates have a retardation value in a range of 1 nm to 500 nm at a wavelength of 550 nm, respectively.

26. The in-plane switching liquid crystal display as claimed in claim 15, wherein the first and second +A-plates have a retardation value in a range of 1 nm to 500 nm at a wavelength of 550 nm, respectively.

27. The in-plane switching liquid crystal display as claimed in claim 16, wherein the first and second +A-plates have a retardation value in a range of 1 nm to 500 nm at a wavelength of 550 nm, respectively.

28. The in-plane switching liquid crystal display as claimed in claim 17, wherein the first and second +A-plates have a retardation value in a range of 1 nm to 500 nm at a wavelength of 550 nm, respectively.

29. The in-plane switching liquid crystal display as claimed in claim 18, wherein the first and second +A-plates have a retardation value in a range of 1 nm to 500 nm at a wavelength of 550 nm, respectively.

30. The in-plane switching liquid crystal display as claimed in claim 15, wherein the first and second +C-plates have a retardation value in a range of 1 nm to 500 nm at a wavelength of 550 nm, respectively.

31. The in-plane switching liquid crystal display as claimed in claim 16, wherein the first and second +C-plates have a retardation value in a range of 1 nm to 500 nm at a wavelength of 550 nm, respectively.

32. The in-plane switching liquid crystal display as claimed in claim 17, wherein the first and second +C-plates have a retardation value in a range of 1 nm to 500 nm at a wavelength of 550 nm, respectively.

33. The in-plane switching liquid crystal display as claimed in claim 18, wherein the first and second +C-plates have a retardation value in a range of 1 nm to 500 nm at a wavelength of 550 nm, respectively.

* * * * *